(12) United States Patent
Davlos et al.

(10) Patent No.: US 9,449,278 B2
(45) Date of Patent: Sep. 20, 2016

(54) CLOUD-BASED DIAGNOSTICS AND REMEDIATION

(71) Applicant: Apple Inc., Cupertino, CA (US)

(72) Inventors: Efstratios N. Davlos, Sausalito, CA (US); Francimar C. Schmitt, Santa Clara, CA (US); Edmund R. Brown, Middletown, CA (US); Gavin Anthony Condon, San Jose, CA (US)

(73) Assignee: Apple Inc., Cupertino, CA (US)

( * ) Notice: Subject to any disclaimer, the term of this patent is extended or adjusted under 35 U.S.C. 154(b) by 310 days.

(21) Appl. No.: 13/958,150

(22) Filed: Aug. 2, 2013

(65) Prior Publication Data

US 2014/0310222 A1    Oct. 16, 2014

Related U.S. Application Data

(60) Provisional application No. 61/811,597, filed on Apr. 12, 2013.

(51) Int. Cl.
| | |
|---|---|
| *G06N 5/04* | (2006.01) |
| *G06F 11/07* | (2006.01) |
| *G05B 23/02* | (2006.01) |
| *H04L 12/24* | (2006.01) |
| *G06F 11/22* | (2006.01) |

(52) U.S. Cl.
CPC ............. *G06N 5/04* (2013.01); *G05B 23/0275* (2013.01); *G05B 23/0278* (2013.01); *G06F 11/079* (2013.01); *G06F 11/2294* (2013.01); *H04L 41/0631* (2013.01)

(58) Field of Classification Search
None
See application file for complete search history.

(56) References Cited

U.S. PATENT DOCUMENTS

| | | | |
|---|---|---|---|
| 6,535,865 B1 | 3/2003 | Skaaning et al. | |
| 6,813,733 B1 | 11/2004 | Li et al. | |
| 7,536,370 B2 | 5/2009 | Masurkar | |
| 7,756,810 B2* | 7/2010 | Nelken et al. | 706/60 |
| 7,890,318 B2 | 2/2011 | Castellani | |
| 2006/0136869 A1* | 6/2006 | Lamm et al. | 717/109 |
| 2012/0078837 A1* | 3/2012 | Bagchi et al. | 706/52 |
| 2013/0047038 A1 | 2/2013 | Huang | |

OTHER PUBLICATIONS

Roth-Berghofer "Learning from HOMER, a Case-Based Help Desk Support System" pp. 88-97, 2004.*
"Case Based Reasoning", http://www.empolis.com/en/smart-information-management/te . . . , 1 page.
"eGain KnowledgeAgent: Use a Proven Contact Center Solution, Implemented by 300 Leading Enterprises", http://www.egain.com/resources/, 6 pages.

(Continued)

*Primary Examiner* — Stanley K Hill
*Assistant Examiner* — Benjamin Buss
(74) *Attorney, Agent, or Firm* — Page Ponsford; DLA Piper LLP US

(57) ABSTRACT

Troubleshooting a technical problem on a user device using a network-based remediation platform. Receiving problem statements relating to technical problems associated with a user device, activating a domain of cases, assigning a score for the cases based on a scoring algorithm, and determining one or more remediation actions to suggest based on the score.

11 Claims, 33 Drawing Sheets

(56) References Cited

OTHER PUBLICATIONS

"Service Knowledge: Knowledge Management for Service Issue Diagnosis and Resolution", http://www.sercigistics.com/solutions/service-knowledge/, 1 page.

"Text Analytics, The Attensity Semantic Annotation Server", http://www.attensity.com/products/technology/semantic-server/, Nov. 9, 2011, 2 pages.

* cited by examiner

| CaseId | Symptom1 | Symptom2 | Diagnostic1 | Diagnostic2 | Instruction |
|---|---|---|---|---|---|
| | Is the unit hot to touch? | Is the cable from the fan connected to the power? | TEST FAN | TEST FAN SPEED | |
| 1 | Expected:Yes weight: 20% | Expected:Yes weight: 20% | testId: 12345 result: false weight: 60% | n/a | instruction: replace fan |
| 2 | Expected:Yes weight: 20% | Expected:Yes weight: 20% | testId: 12345 result: true weight: 20% | testId: 8642 result: RPM<1000 weight: 40% | instruction: calibrate fan |
| 3 | Expected:Yes weight: 20% | Expected:Yes weight: 20% | testId: 12345 result: true weight: 20% | testId: 8642 result: RPM>2000 weight: 40% | instruction: clean fan |
| 4 | Expected:Yes weight: 20% | Expected:No weight: 80% | n/a | n/a | instruction: make sure power cable connectors are seated. |
| 5 | Expected:No weight: 10% | Expected:Yes weight: 10% | testId: 12345 result: false weight: 80% | n/a | inference: add the "power" domain to the active list |

FIG. 7

CLOUD-BASED DIAGNOSTICS AND REMEDIATION

CROSS-REFERENCE TO RELATED APPLICATIONS

This application claims priority to U.S. Application No. 61/811,597, entitled "CLOUD-BASED DIAGNOSTICS AND REMEDIATION", filed Apr. 12, 2013, of which the full disclosure of this application is incorporated herein by reference for all purposes.

TECHNICAL FIELD

The present technology pertains to troubleshooting, and more specifically pertains to a system for providing users with optimized suggestions for performing remediation actions.

BACKGROUND

Current troubleshooting techniques employ inadequate checklists and one-sided diagnostic testing sessions. Indeed, the processes of a user performing trial and error troubleshooting without expert advice and a technician following pedantic and time-wasting checklists without feedback from a user are a huge waste of time.

Known troubleshooting systems do not integrate machine knowledge with human interaction with an electronic device. Additionally, known systems do not integrate past experiences learned from interaction with a large distributed userbase with a system that can learn from those experiences.

There is a need in the art for high quality and inexpensive troubleshooting that combines artificial intelligence, machine learning, human feedback, and intelligent optimization algorithms into a cloud-based platform serving and learning from a distributed userbase.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for remediating technical problems with an electronic device using a network-based diagnostic platform containing a knowledge base, a diagnostic engine for processing optimization algorithms, a machine learning component, and a network interface configured for accepting input from users.

The diagnostic engine accepts a plurality of inputs relating to the reported problems, device properties (derived from serial number), diagnostic decision rules (scripts) and rule tree hierarchies (both preprogrammed and generated by machine learning), etc. Next, the diagnostic engine creates a vector of all of the relevant inputs and applies optimization algorithms to create a plurality of inferences about how to solve the problem and associated weights for the inferences to indicate the most probable cause of the reported problem.

The diagnostic engine creates a plurality of scripts for applying diagnostic tests to identify the problems, packages the scripts, and sends the packaged scripts to the device. The device uses preprogrammed logic for executing the scripts attempt to diagnose the problem. Once a problem is (inferred to have been) identified, the diagnostic engine can provide the user of the device with proposed fixes.

Some embodiments involve storing records or reference codes of past diagnostic repairs on a device itself that can be later used as an input. Some embodiments of the present technology involve tailoring the recommendations based on the technological savvy of the operator of the device based on user type credential.

Some embodiments of the present technology involve a system with a diagnostic engine that accepts user inputs and the results of diagnostic tests and that recommends remedial actions. The system can package and send diagnostic scripts to the user's device for executing remedial actions on the device. The system can identify remedial actions by scoring items in a database containing a plurality of diagnostic cases describing possible diagnostic solutions for a plurality of technical problems. In some embodiments, the system uses a generative rule engine that analyzes the effectiveness of diagnostic solutions for solving past technical problems and provides effectiveness data to the user device for diagnosing a symptom.

Some embodiments of the present technology involve a method of troubleshooting a technical problem on a user device using a network-based remediation platform. The platform can receive problem statements relating to technical problems associated with a user device and determine one or more remediation actions to suggest. The platform can analyze the details of the problem statement, activate a domain of cases, and assign a score for the cases based on a scoring algorithm. If any of the cases exceed a threshold score, the platform can send a remediation object identified in the case to the user device. If the scores do not exceed a threshold score, the platform can iteratively activate and score additional domains until a database item having a score exceeding the threshold score is identified.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 7 illustrates decision tree transformed into cases according to some embodiments of the present technology;

DESCRIPTION

Figure 1A:
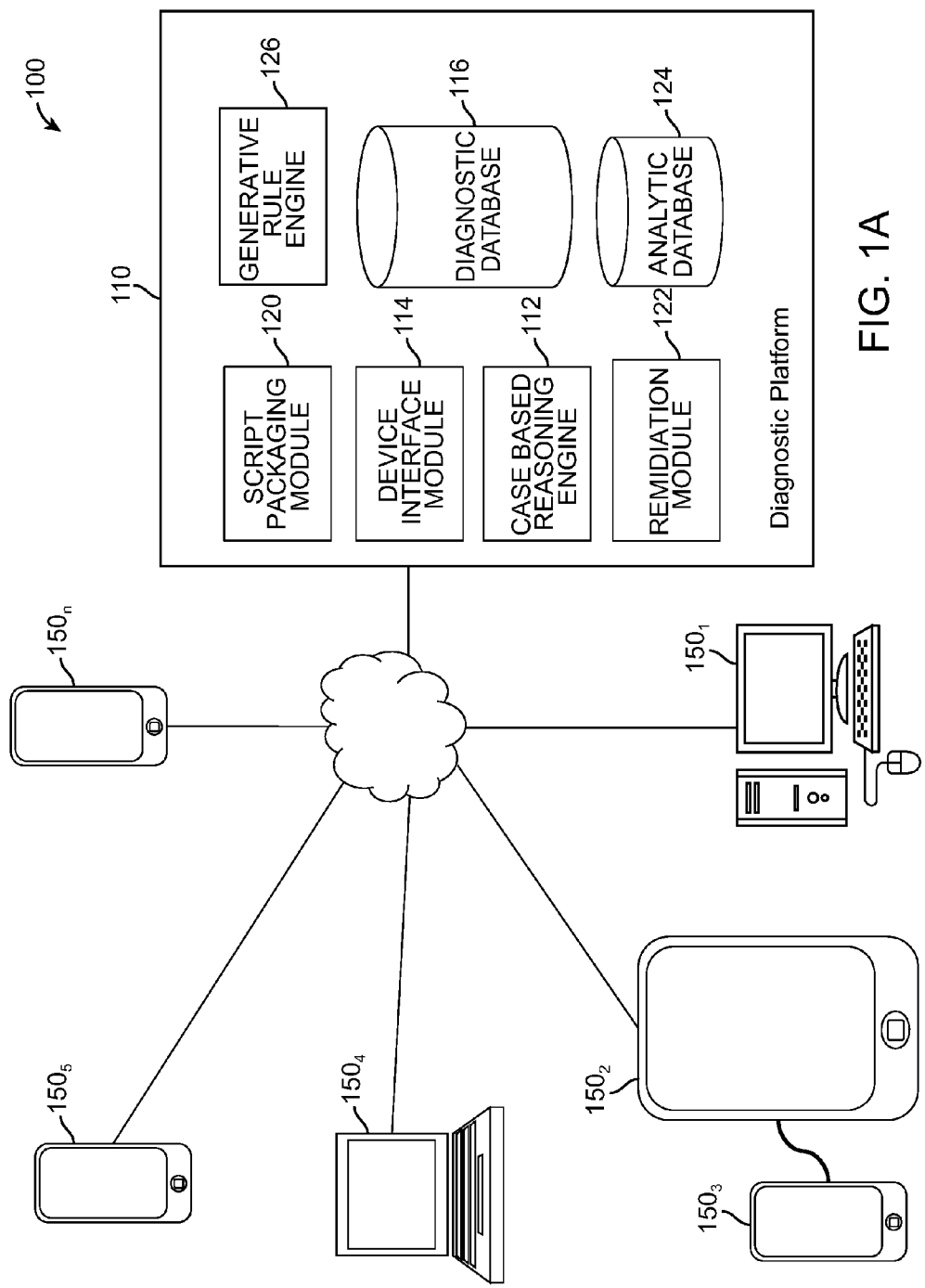
FIG. 1A illustrates a system that includes a network-based diagnostic platform testing, troubleshooting, and remediating hardware and software processes for a plurality of devices according to some embodiments of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for a high quality and inexpensive troubleshooting process. Indeed, some embodiments of the present technology involve a network-based diagnostic platform enabling machines and technicians to test, troubleshoot and remediate device hardware and software processes. This system improves the efficiency and quality of the troubleshooting process thus reducing the cost of remediation services and warranty repairs by guiding users and technicians to the best solution.

The technology involves systems, methods, and computer-readable media for remediating technical problems with an electronic device using a network-based diagnostic platform containing a knowledge base, a diagnostic engine for processing optimization algorithms, a machine learning component, and a network interface configured for accepting input from users.

The diagnostic engine accepts a plurality of inputs relating to the reported problems, device properties (derived from serial number), diagnostic decision rules (scripts) and rule tree hierarchies (both preprogrammed and generated by machine learning), etc. Next, the diagnostic engine creates a vector of all of the relevant inputs and applies optimization algorithms to create a plurality of inferences about how to solve the problem and associated weights for the inferences to indicate the most probable cause of the reported problem. The diagnostic engine creates a plurality of scripts for applying diagnostic tests to identify the problems, packages the scripts, and sends the packaged scripts to the device. The device uses preprogrammed logic for executing the scripts attempt to diagnose the problem. Once a problem is (inferred to have been) identified, the diagnostic engine can provide the user of the device with proposed fixes.

Some embodiments involve storing records or reference codes of past diagnostic repairs on a device itself that can be later used as an input. Some embodiments of the present technology involve tailoring the recommendations based on the technological savvy of the operator of the device based on user type credential.

In some embodiments, the diagnostic platform utilizes a case-based reasoning (CBR) and machine introspection techniques to identify the root cause and resolve problems. In some embodiments, a CBR engine compares facts about the unit under test (UUT) to a database of cases representing previously discovered solutions to problems. The diagnostic platform can gather additional facts by running diagnostic tests on the UUT and by soliciting input from a human operator. As the CBR engine gathers information from the user and the device, it evaluates the probability of various problems and will continue to gather relevant facts until an emerging problem crosses an acceptable threshold.

Initially, a diagnostic database stores a library of cases that have been manually entered using troubleshooting decision trees. Over time, the diagnostic platform will harvest new cases from data gathered through use of the system and by and through feedback provided from entities that service, modify, or produce electronic devices. The harvesting process is a generative process that utilizes machine learning techniques (e.g. p-LDA, HMM), to derive latent features such as root causes from observed symptoms and applied.

FIG. 1A illustrates a system 100 that includes a network-based diagnostic platform 110 testing, troubleshooting, and remediating hardware and software processes for a plurality of devices $150_1$, $150_2$, $150_3$, $150_4$, $150_5$, ..., $150_n$ according to some embodiments of the present technology.

As shown in FIG. 1A, the diagnostic platform 110 involves case-based reasoning (CBR) engine 112 for diagnosing the devices $150_1$, $150_2$, $150_3$, $150_4$, $150_5$, ..., $150_n$ using input received from a device interface module 114 and knowledge from a diagnostic database 116 in the form of past cases, previously discovered solutions, etc. The CBR engine 112 also includes a generative rule engine 118 for gathering data from new cases, analyzing the effectiveness of the solutions derived from past cases, and applying machine learning techniques for developing new solutions.

As explained above, the CBR engine 112 gathers information from the user and the device and evaluates probabilities for solutions. In some embodiments of the present technology, one or more solutions that exceed a threshold probability are packaged as a script that can be used on a device to automate a diagnostic test for addressing a reported problem. Indeed, the diagnostic platform 110 can include a script packaging module 120 that is configured for packaging scripts and sending them to one or more of the devices $150_1$, $150_2$, $150_3$, $150_4$, $150_5$, ..., $150_n$ via the device interface module 114.

The diagnostic platform 110 also includes a remediation module 122 and an analytics database 124 for providing the devices with one or more possible solutions. The remediation module 122 can be configured to receive the results of the diagnostic tests run on the devices $150_1$, $150_2$, $150_3$, $150_4$, $150_5$, ..., $150_n$ based on one or more script. Based on these results, the remediation module 122, the CBR engine 112, or both can be configured to recommend instructions for remediation of the problem. In some embodiments of the present technology, the diagnostic platform 110 includes an analytics database 124 containing remediation objects such as text-based instructions, graphical instructions, instructional videos, links to external web pages providing instructions, forms used to send parts away for repair, warranty forms, software patches, software applications, etc.

In some embodiments of the present technology, the diagnostic platform 110 also involves a generative rules engine 126. As explained above, the diagnostic database 116 is initialized with cases that have been manually entered, but over time, the diagnostic platform will harvest new cases from data gathered through use of the system. Indeed, the generative rules engine 126 is configured for applying machine learning techniques to derive, or generate, know from observed symptoms and the success or failure of the solutions, as inferred by the CBR engine 112.

The devices $150_1$, $150_2$, $150_3$, $150_4$, $150_5$, ..., $150_n$ comprise various types of electronic devices that can benefit from the present technology. Although specific examples are illustrated, those with ordinary skill in the art having the benefit of this disclosure will readily understand that any type of electronic device, now known or later developed, can utilize the approaches disclosed herein.

Additionally, a supported device $150_3$ can interact with the diagnostic platform 110 through a supporting device $150_2$. For example, if the supported device $150_3$ has an inoperable screen, a user cannot troubleshoot the problem since the screen is oftentimes the primary way that information is provided and advice is given. Therefore, the supporting device $150_2$ can act as an intermediary and can be used to troubleshoot the problems of the supported device $150_3$.

Some embodiments of the present technology involve application programming interfaces (APIs) that allow connection and communication between devices and the Diagnostic Platform 110.

Some embodiments of the present technology involve an API that will allow client applications (e.g. Mobile Genius, GSX, iLog) to connect to the Diagnostic Platform 110 and create troubleshooting sessions. Through these client apps the user will be prompted for input and notified when AIDE has a recommended solution. Another example involves an API for communication between the target device and the Diagnostic Platform 110 that involves a mechanism that allows the Diagnostic Platform to gather information from and execute diagnostic tests on the target device.

Figure 1B:
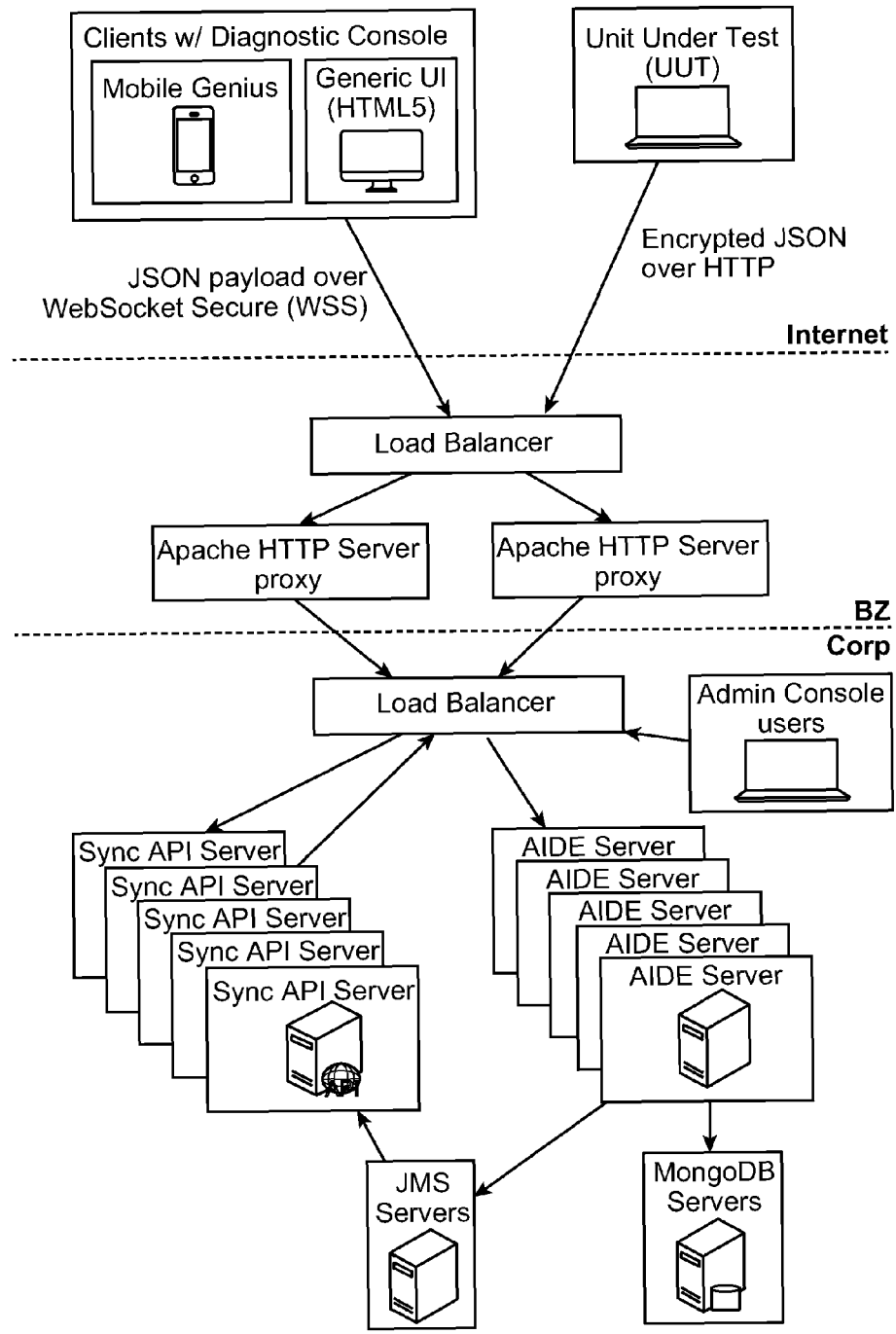
FIG. 1B illustrates a system architecture configured for executing case-based reasoning to troubleshoot diagnostics according to some embodiments of the present technology.

FIG. 1B illustrates a system architecture 199 configured for executing case-based reasoning to troubleshoot diagnostics according to some embodiments of the present technology.

In some embodiments, the CBR engine stores one or more reference code on the device itself (UUT). The reference codes can describe symptoms, remedial actions taken, etc. and can be used to inform future interactions with the CBR engine.

Case-Based Reasoning

This portion of the disclosure details the data types, object, etc. used in the operation of the CBR engine according to some embodiments of the present technology. The following set of definitions will aide in the readers understanding of the present technology.

Advanced Interactive Diagnostic Engine (AIDE): synonym for Diagnostic Engine.

Case: Cases represent situations (conditions) and actions to be performed when the conditions are met. A highly simplified example might be a situation where a laptop will not turn on and another condition is that it's not plugged into a power outlet so the action to be performed to resolve the issue would be to plug the power cord into a socket.

Composite: Composites are combination of one or many primitive objects. Composites must have at least one input primitive object.

Diagnosis: Diagnosis are the results of diagnostic tests that can be acquired by running tests or scripts on a unit under test or by introspecting individual components on the unit under test.

Domain: Domains are containers of cases. For example a domain called POWER can contain all cases related to POWER problems.

Inference: An instruction to the CBR engine.

Instruction: An instruction to the user.

Lua: Lua is a scripting language that can be used to create test scripts that will execute on an electronic device.

Diagnostic Script Library: A library for allowing appropriate users to create arbitrary Lua scripts and associate them with test suites.

Module: Managed in the Diagnostic Script Library, a module is a collection of two or more built-in diagnostic tests that are executed as a group. Typically a module would be comprised of related tests (e.g., all tests for fans).

Primitive: Primitives are the basic objects that constitute a problem and the corresponding remediation. The circumstances under which a problem occurs is a vector of attribute value pairs. For the purposes of this document, these attributes and the corresponding possible values are called primitives. In addition, a remediation is also a primitive object as it can be reused as a solution to many problems.

Session: Short for "troubleshooting session", this composite object represents stores the data gathered while trying to solve a particular problem with a device. The CBR engine will compare the attributes of the session to the existing case objects to find likely matches.

Suite: A combination of test modules and/or Lua functions. For each suite object the Diagnostic Script Library will dynamically generate a Lua script that executes on the UUT and sends the results back to the reasoning engine.

Symptoms: Symptoms are visible clues that can be entered by humans or inferred by diagnostic readings.

Taxonomy: A hierarchical set of correlated concepts that can be selected by the user or the machine as inputs to the reasoning engine.

Test: A diagnostic test that is built-in to the device. These tests can run in either EFI or OS mode.

Unit Under Test (UUT): This refers to the device that is the subject of the diagnostic troubleshooting session. Through new software that will start shipping on future Macs, the UUT will be able to communicate with diagnostic engine.

Figure 2:
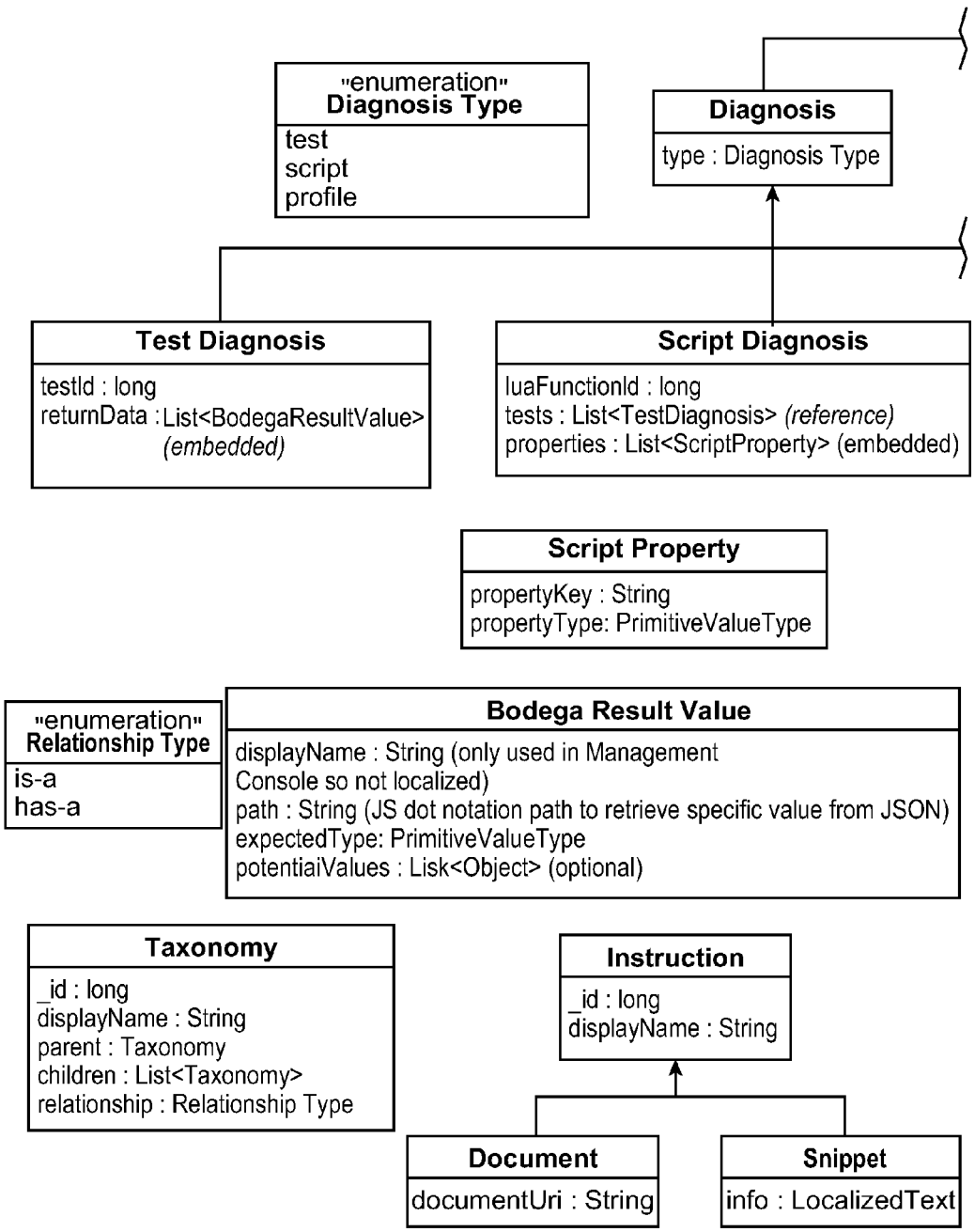
FIG. 2 illustrates a graphical representations of the data types used in case-based reasoning according to some embodiments of the present technology.
Figure 2:
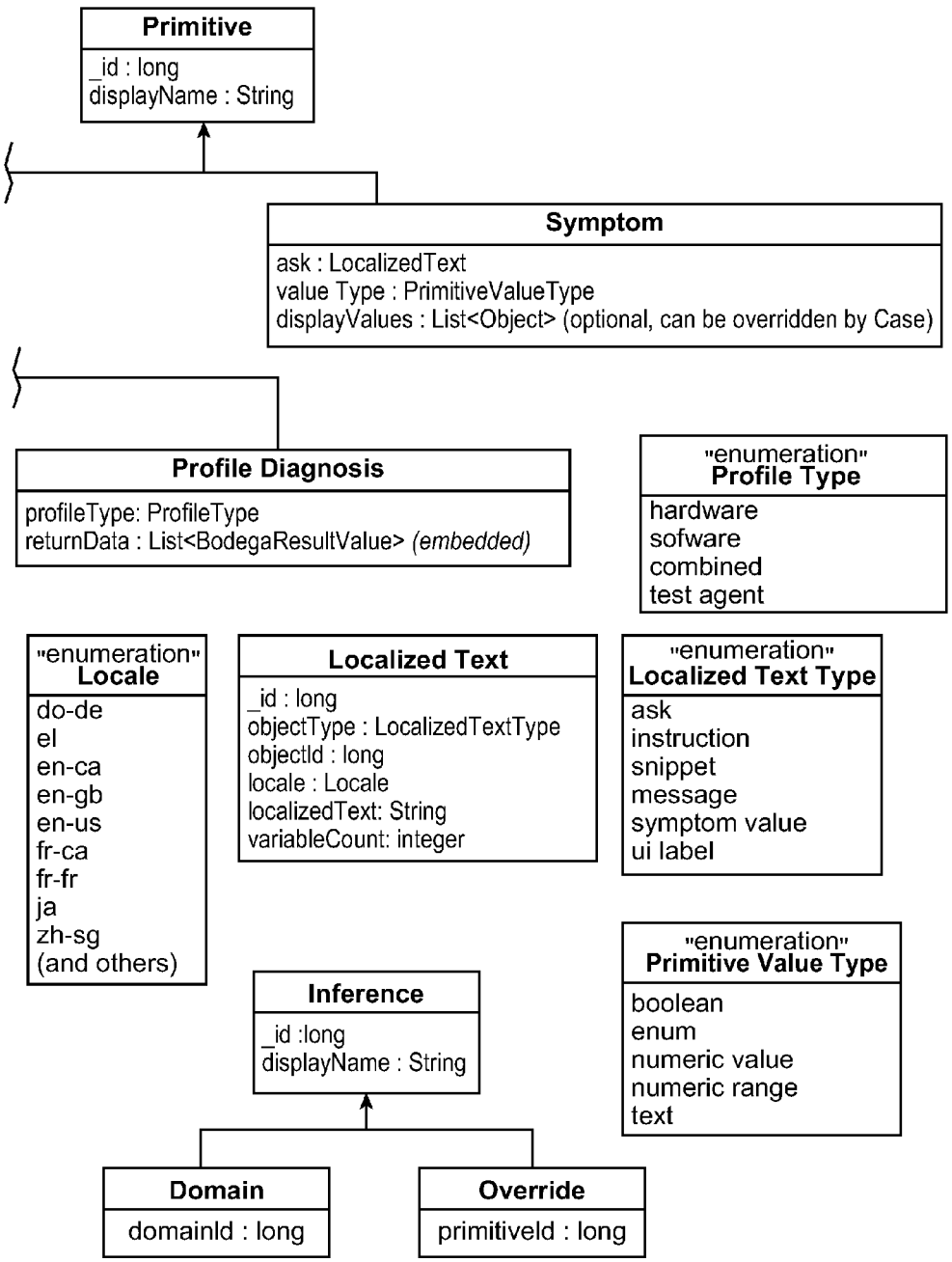
Figure 3:
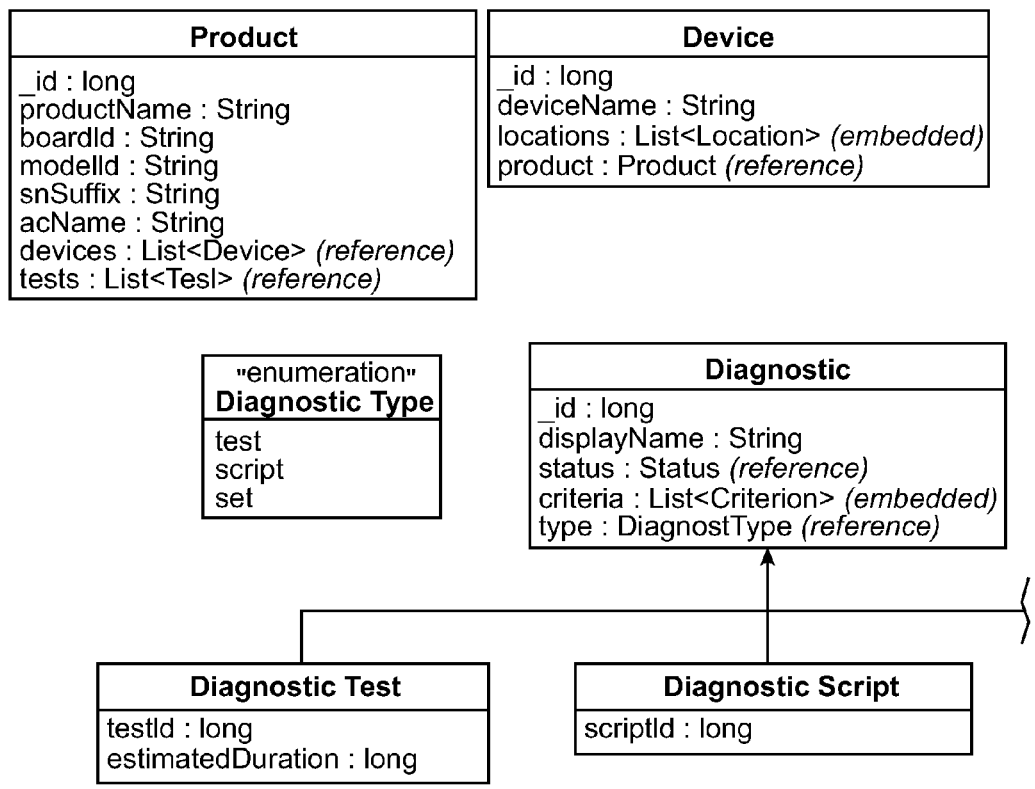
FIG. 3 illustrates a graphical representations of the data types used in case-based reasoning according to some embodiments of the present technology.
Figure 3:
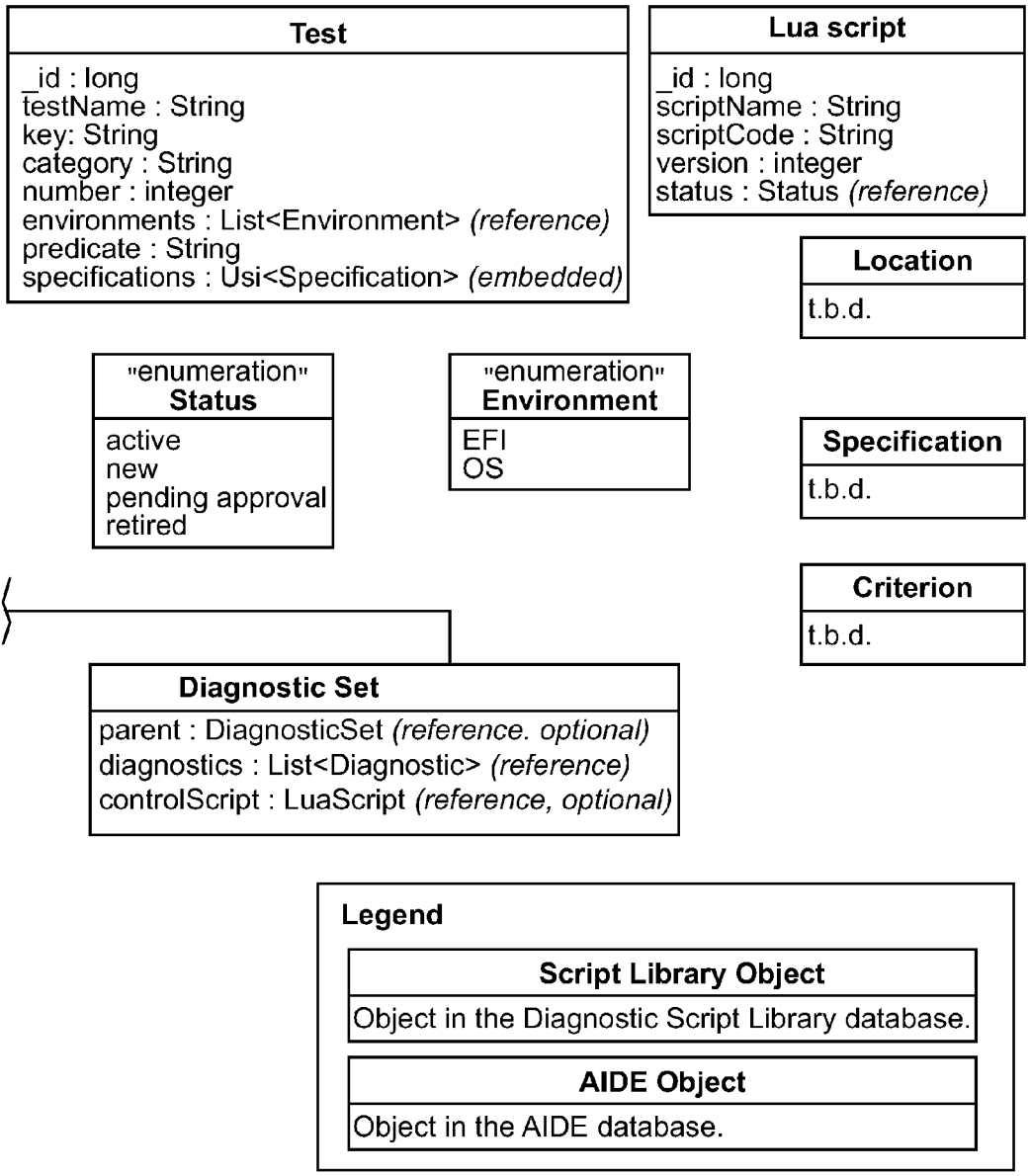
Figure 4:
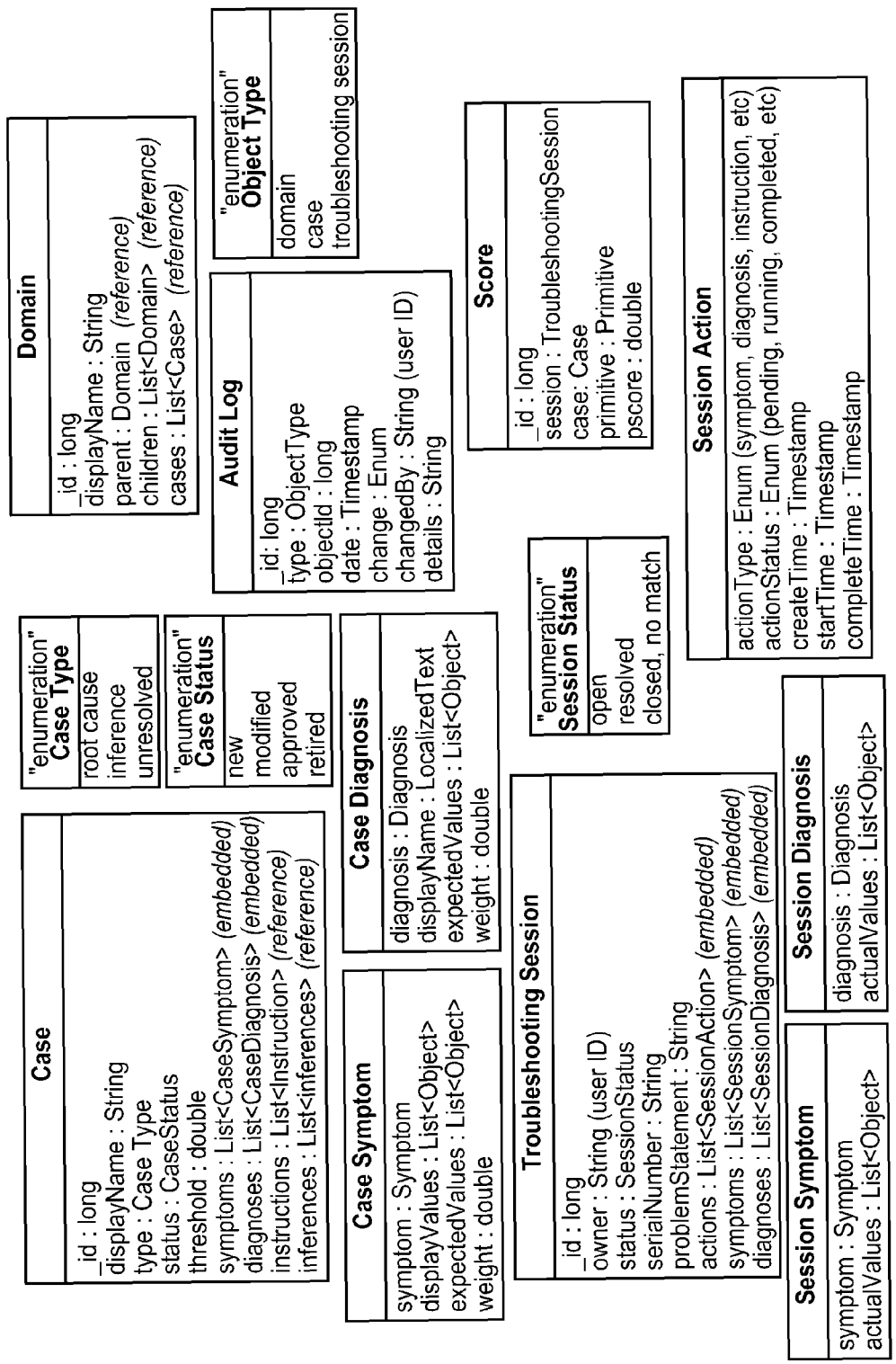
FIG. 4 illustrates a graphical representations of the data types used in case-based reasoning according to some embodiments of the present technology.

FIGS. 2-4 illustrate graphical representations of the data types used in case-based reasoning according to some embodiments of the present technology.

Primitives in Detail

As explained above, primitives are the basic objects that constitute a problem and the corresponding remediation. The circumstances under which a problem occurs is a vector of attribute value pairs. For the purposes of this document, these attributes and the corresponding possible values are called input primitives. In addition, remediation activities (such as tests or fixes) are also primitive objects because they can be reused as actions to many problems. The following primitives are supported: Input primitives (symptom, diagnosis, taxonomy); Remediation primitives (instruction, inference); and Script Library primitives (product, device, test, lua script); Admin primitives (localized text).

Symptoms

Symptoms are visible clues that can be entered by humans or inferred by diagnostic readings. The following mutations are supported: Text, List, Number, and Boolean.

Text—Text based symptoms are used to declare a problem statement. Problem statements will be indexed to support search.

LIST—One or more selectable values from enumerated or taxonomical lists.

NUMBER—Single point or range of numeric values

BOOLEAN—True or False

Symptoms Attributes include: ask and value. Ask attributes involve a human readable, rich text prompt used to solicit input from the user. Ask attributes can be received in response to a voice prompt. Value attributes involve LIST and NUMBER types that comprise types of symptoms that require a declaration of acceptable values.

Diagnosis

A Diagnosis is the result of diagnostic tests or Lua scripts executed on the UUT or by introspecting individual components on the UUT. The following mutations are supported: TESTRESULT, SCRIPTRESULT, PING.

TESTRESULT: Represents the outcome of a build-in diagnostic test; SCRIPTRESULT: Represents the properties returned after execution of a Lua script; and PING—Represents the outcome of a ping operation.

Diagnosis Attributes include testID (a unique identifier for a built-in diagnostic test); scriptID (a unique identifier for the Lua script); component (a component name tested or pinged); and value (PASS/FAIL for TESTRESULT type of diagnosis. LIVE/UNKNOWN for PING.)

Taxonomy

A taxonomy is a hierarchical set of correlated concepts that can be selected by the user or the machine as inputs to the reasoning engine. Attributes of a taxonomy include parents (using a parent concept ID), children (using a child concept ID), and a relationship (defining relationships between parents and children).

Instruction

An instruction is a remediation primitive provided to the user. Instructions can comprise documents that can be launched or "snippets" comprising text instructions that would show on the interactive UI. Instruction attributes can comprise: docURI (the unique resource identifier for the document) and permissions (a series of bits that would allow or deny the propagation of this instruction to the user).

Inference

An inference is a remediation primitive provided to the CBR Engine. Inferences can comprise a domain (the inclusion/exclusion of a domain) and an override (a system driven modification of primitives). Attributes of an inference can comprise: a domainID (the domain to be activated/deactivated); an inputID (the primitive ID to be overridden and its corresponding inferred value); and a permission (a series of bits that would allow or deny the propagation of this inference).

Product

A product comprises information about a specific electronic device product. Attributes of a product can comprise: a key (a unique numeric identifier for this product which is assigned by the Hardware Engineering team at start of product lifecycle); a productName (the Hardware Engineering name for the product); a boardId (unique identifier for the motherboard in a product); a modelId (unique identifier for the model); a snSuffix (the serial number suffix for this product; will be used to resolve a product using the serial number); a acName (the AppleCare name of the product, will display in the Diagnostic Console); devices (an array of the device objects that map to this product); and tests (an array of the test objects that map to this product).

Device

A device refers to a component device that is part of a UUT. Components such as sensors are sometimes not listed in the UUT's profile so they have to be stored separately in the Diagnostic Script Library database. Attributes of a device can comprise: deviceName (the display name for a test, shown in Diagnostic Script Library); locations (an array of locations for where the device is installed in a product); a product (a reference to the product object that this device belongs to).

Test

A test can comprise a Bristol test that is built-in to a UUT. Test can run from Extensible Firmware Interface (EFI) or Operating System (OS). Attributes of a test can comprise: testName (the display name for a test, shown in Diagnostic Script Library and AIDE Management Console); key (the unique numeric ID of the test object); category (category of test (Battery, Fan, Sensor, etc.)); environments (array of environments (Extensible Firmware Interface (EFI) or Operating System (OS)) where this test can run); specifications (list of inputs used by test (e.g., min and max RPM range for a fan test)).

Lua Script

A lua script or a snippet of Lua code can used to build diagnostic suites that are executed on the UUT. Attributes of a lua script can comprise: a scriptName (the display name for this script, shown in Diagnostic Script Library and AIDE Management Console); a scriptCode (the actual Lua code that can be stored as a blob of text); a version (a numeric version number assigned to a Lua script); and a status (the status of the script (e.g., "active", "new", "pending approval", "retired")).

Localized Text

Localized text can be stored for specific language/country combinations and can be used to localize the text for ask and instructions and other messages displayed in the Diagnostic Console. Attributes of localized text can comprise: an objectType (the type of object being localized (e.g., Ask, Instruction, value label, system message, etc.)); an objectId (the object ID for the item being localized (e.g., the ID of the specific Instruction record)); a locale (the standard language and locale code used by a device provider); localizedText (the actual text in the local language); a variableCount (if the localized text contains any variables, how many variables are there).

Composites in Detail

As explained above, composites are combination of one or many primitive objects. Composites can have at least one input primitive object. The following composite objects are supported: cases, domains, troubleshooting sessions, diagnostics, and diagnostic sets.

Cases

Cases can represent situations (conditions) and actions to be performed when the conditions are met. The following case mutations can be supported: ROOTCAUSE (the exact root cause when the conditions are met); INFERENCE (instructions to the reasoning engine); UNRESOLVED (represent situations where the root cause is unknown but the actions rectify the problem.) Cases can comprise the following attributes: symptoms (one or many symptoms); diagnosis (results of diagnostic tests); instruction (instructions to the user); inference (instructions to CBR); threshold (numeric value (%) above which the case is declared as the right solution or the actions are executed); weight (the weight or importance of a each Symptom, Diagnosis, Test); and a permission (a series of bits that would allow or deny the activation of this case).

Domains

Domains are containers of cases. For example a domain called POWER can contain all cases related to POWER problems. Attributes of domains can include: cases (one or many cases); parents (parent domains); children (sub-domains); and permissions (a series of bits that would allow or deny the activation and visibility of this domain).

Troubleshooting Sessions

Troubleshooting sessions (a.k.a., "sessions") can represent a specific interaction between a technical support entity and a customer unit to troubleshoot a problem.

An active troubleshooting session is a session that is actively being worked by a technical support entity. A "CLOSED_RESOLVED" session is a session that has been closed after finding a satisfactory resolution. A "CLOSED_UNRESOLVED" session is a session that has been closed without finding a resolution. This scenario can happen when there are gaps in the case library. A "DORMANT" session is a session that has been temporarily closed and may continue in the future by the same or another operator. In some embodiments, the AIDE or an operator may mark this session as dormant. (i.e. ten minutes before timing out).

Attributes of a troubleshooting session can comprise: a serial number (the serial number for the unit); a problem statement (a problem statement entered at the beginning of the process; this will be searched by AIDE to identify the appropriate domains for this troubleshooting session) a status (the status of the session ("active", "closed", etc.)); an owner (a unique user ID representing the current owner of the session); symptoms (a collection of symptoms and their corresponding values that have been provided by the user); a diagnoses (a collection of results from running diagnostics on the unit (tests and/or Lua scripts)); and actions pending (a collection of actions that the AIDE system has deemed necessary to run for this unit (which can be a diagnostic test on the UUT or a question asked of the technician via the UI); when an action is completed the result is added to either the Symptoms or Diagnoses collections).

Diagnostics

Diagnostics are wrappers for objects from the Diagnostic Script Library. They can be wrappers for Bristol tests and Lua scripts that add additional information that is relevant to the reasoning engine such as conditions for use, expected duration, etc. Types of diagnostic can include: a TEST (a diagnostic that is a wrapper for a Bristol test); a SCRIPT (a diagnostic that is a wrapper for a Lua script/function); a SET (a diagnostic that represents a collection of other diagnostics. Diagnostic attributes can comprise: a displayName (the display name for this diagnostic; shown in the AIDE Management Console); a criteria (a list of boolean criteria that will be used by the AIDE system at runtime to determine if a particular diagnostic item should be sent to the UUT); a type (e.g. a Bristol test, Lua script, or a set); a scriptId (the ID of a Lua script object in the Diagnostic Script Library); a testId (the ID of a Bristol test object in the Diagnostic Script Library); and an estimatedDuration (the estimated execution time (e.g. in seconds) for this test which can be a best guess as results may vary).

Diagnostic Sets

Diagnostic sets can comprise a collection of diagnostic objects (which themselves can be either a Bristol test, a LUA script, or another diagnostic set). A diagnostic set can be hierarchical where one may have a parent and children. The purpose of using diagnostic sets is to create logical groupings of tests and then create a grouping of those groups (or "Suites"). Diagnostic set attributes can comprise: a displayName (the display name for this diagnostic set; shown in the AIDE Management Console); a status (indicates whether a particular diagnostic set is approved for active use or if it's being reviewed or has been retired); a criteria (a list of boolean criteria that will determine if this particular diagnostic set will be run on the UUT which can be conceptually the same as the criteria that's part of the individual diagnostic objects); a parent (a parent object for this diagnostic set; the parent will also be a diagnostic set); a diagnostics attribute (an array/collection of diagnostic objects; these represent the children in the hierarchy and will be run in the sequence specified by the creator); and a controlScript (an optional Lua script/function that will provide additional orchestration when running the child diagnostics).

Case Operation

As explained above, a case is a composite object that points to specific solutions or inferences when there is a sufficient number of matching conditions. Some examples of cases include:

Overheating computer: Root Cause: Defective fan;

Overheating computer: Root Cause: Loose cable connected to fan; and

Overheating computer: fan and cable ok Root Cause: No power source to the fan.

Cases include two types of primitives: input primitive(s) and remediation primitive(s).

Input Primitives

Input primitives can be provided by the operator (e.g. problem statement, visible evidence, etc) and/or produced by the UUT as the outcome of a diagnostic test(s). A minimum of one input primitive and the expected value can be declared with a case.

Each input primitive attribute is assigned a weight (a value between 1% and 100%) that signifies the relevance of that attribute toward the action associated with the case. The sum of all input primitive attributes should not exceed 100%.

These weights can be based on the probability of a particular outcome or it can be based on a business driven best practice motivation such as: time to resolution optimization, recommended disassembly steps, safety, etc.

As part of the troubleshooting process it can be preferable to explicitly accept or reject Cases whose action is an Instruction that proposes a solution to an issue.

Remediation Primitives

Remediation primitives are either (1) instructions to the UUT or the user or (2) inferences; that is instructions to the CBR engine. A case may have multiple instructions or inferences attached to it. Each instruction and inference can be access controlled and maybe conditionally applied if it matches the users permissions.

The reasoning engine assigns a score to each case when new conditions are fed into AIDE from the operator or the UUT. A case is applicable when the case has a positive score. A particular case is likely when its score is above threshold. When the score is 100%, then the case is confirmed. At every stage the case may promote its primitives assuming that the score is amongst the top leading cases (typically top-5). The remediation primitives inherit the score of the case and the instruction primitives are propagated to the UUT or the user console.

Instructions to the operator are shown in the user console. Some of the instructions may be mandatory steps that the user must perform. Those will manifest as check lists and when the user performs them, the system will record their completion in the session (see next section). Optional instructions maybe rejected by the user. Rejected instructions are also recorded in the session together with the supporting commentary. When an instruction is rejected, it will be prohibited from showing on the console for the life of the session (and spawning sessions) even if other cases promote the same instruction.

Figure 5:
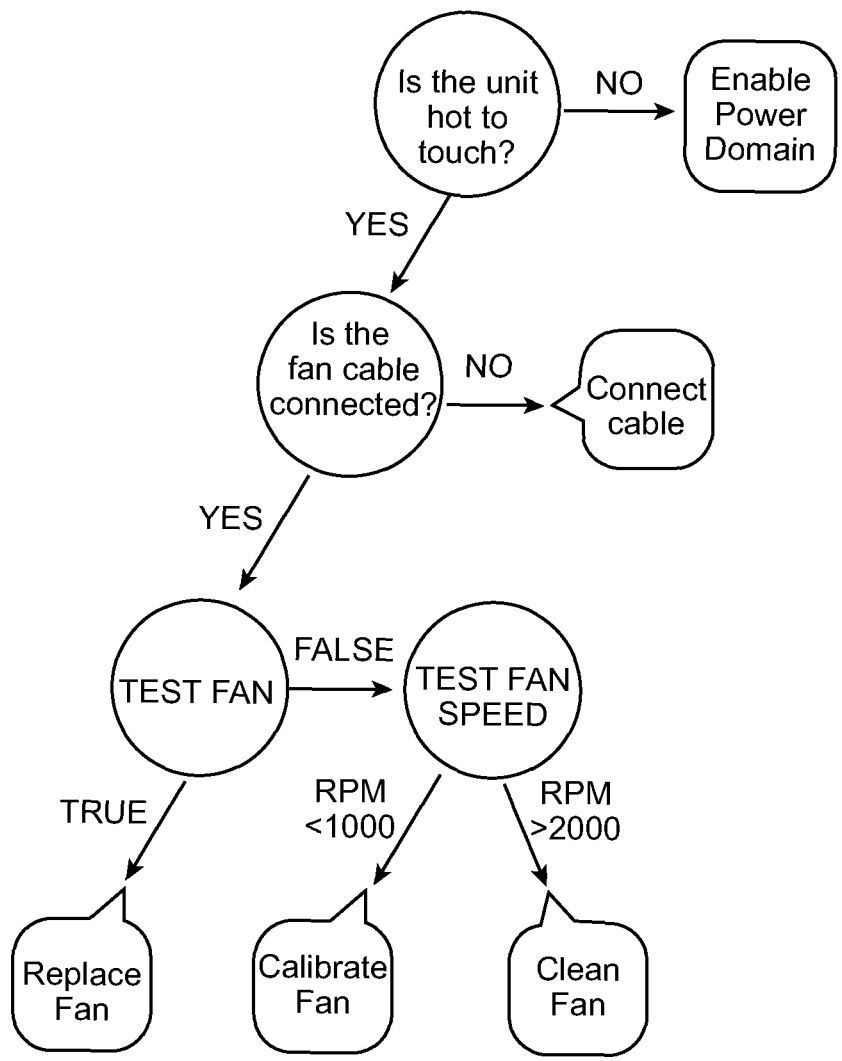
FIG. 5 illustrates an exemplary decision tree according to some embodiments of the present technology.
Figure 6:
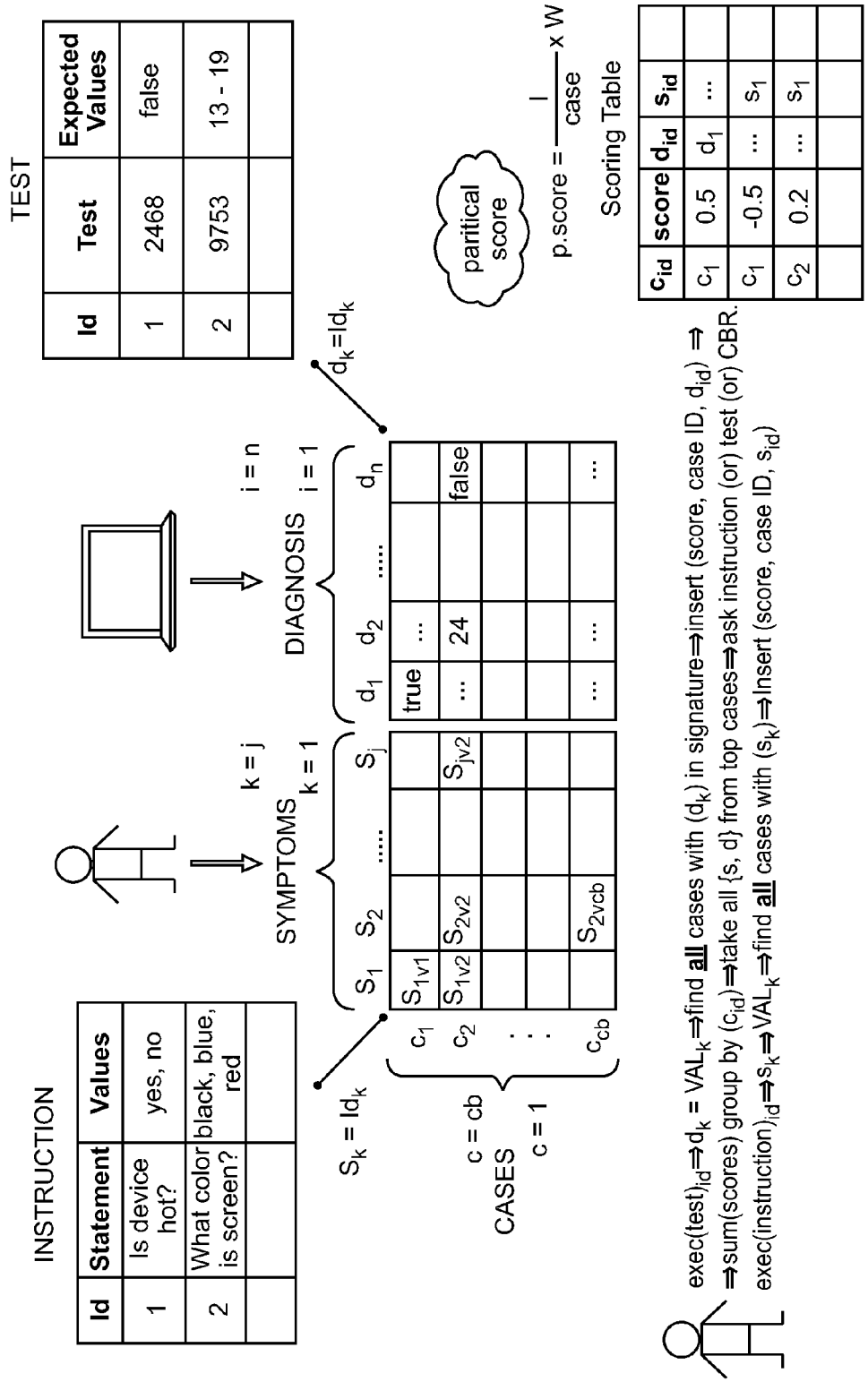
FIG. 6 illustrates a graphical representation of cases being assembled according to some embodiments of the present technology.

In some embodiments of the present technology, cases are generated from decision trees with end nodes comprising an instruction or inference. Each decision node and corresponding branch value will map to an input primitive. In some embodiments, the CBR engine (initially) assigns weights evenly across input primitives. FIG. 5 illustrates an exemplary decision tree according to some embodiments of the present technology. FIG. 6 illustrates a graphical representation of cases being assembled according to some embodiments of the present technology. FIG. 7 illustrates decision tree transformed into cases according to some embodiments of the present technology.

Troubleshooting Sessions

A troubleshooting session (aka session) is a short lived composite object responsible for holding the state of CBR Engine while transacting with the operator and the UUT. The lifespan of a session begins when a user starts a new troubleshooting process. As a composite object it consists of the two primitive types and their corresponding values pertinent to the UUT: a symptom; and a diagnosis.

In addition to primitive objects, a session can hold:
information about the device such as the serial number or board ID;
information about the user such as: user ID, name, profile, location, IP address;
the raw problem statement as typed by the operator;
timestamps marking the start and end of a session;
user activities such as: 'read a document', performed an instruction, accept/reject of an instruction;
pending actions to accommodate situations where the reasoning engine determines the need to run a particular diagnostic test but the UUT is busy executing other tests. The pending test be added to the session in a queue and will remain there until it is executed on the UUT and the result is received; and
additional information to track which stage the session is in it's lifecycle.

Session Ownership

Each session will be associated with a unique user ID that will be the "owner" of that session. Sessions are returned to the pull of open sessions when the owner closes the session. At that point another user can take ownership of the session.

Example: the session is created by a technical expert in a brick and mortar electronics retail store. If the customer's issue cannot be resolved at the genius bar then the device might be kept at the store for further evaluation or possibly sent to a service depot. At the service depot another technician may resume the session and consequently that user will become the new owner.

A status field will indicate whether a session is active, unresolved or closed. When a session is active that means a particular unit is being diagnosed or repaired and the process has not been completed. AIDE will only allow one active session for a particular UUT.

When a service incident is completed, the session is marked as closed. A closed session contains the instruction/solution that lead to the remediation of the problem statement. However, there may be situations where AIDE could not propose a viable solution. These closed but unresolved sessions will have a special designation called unresolved. If the user has a solution that was not proposed by AIDE, the user may upload the solution to AIDE for further analysis and upon approval the new solution will be published as a new case for others to use.

Troubleshooting Process

Figure 8:
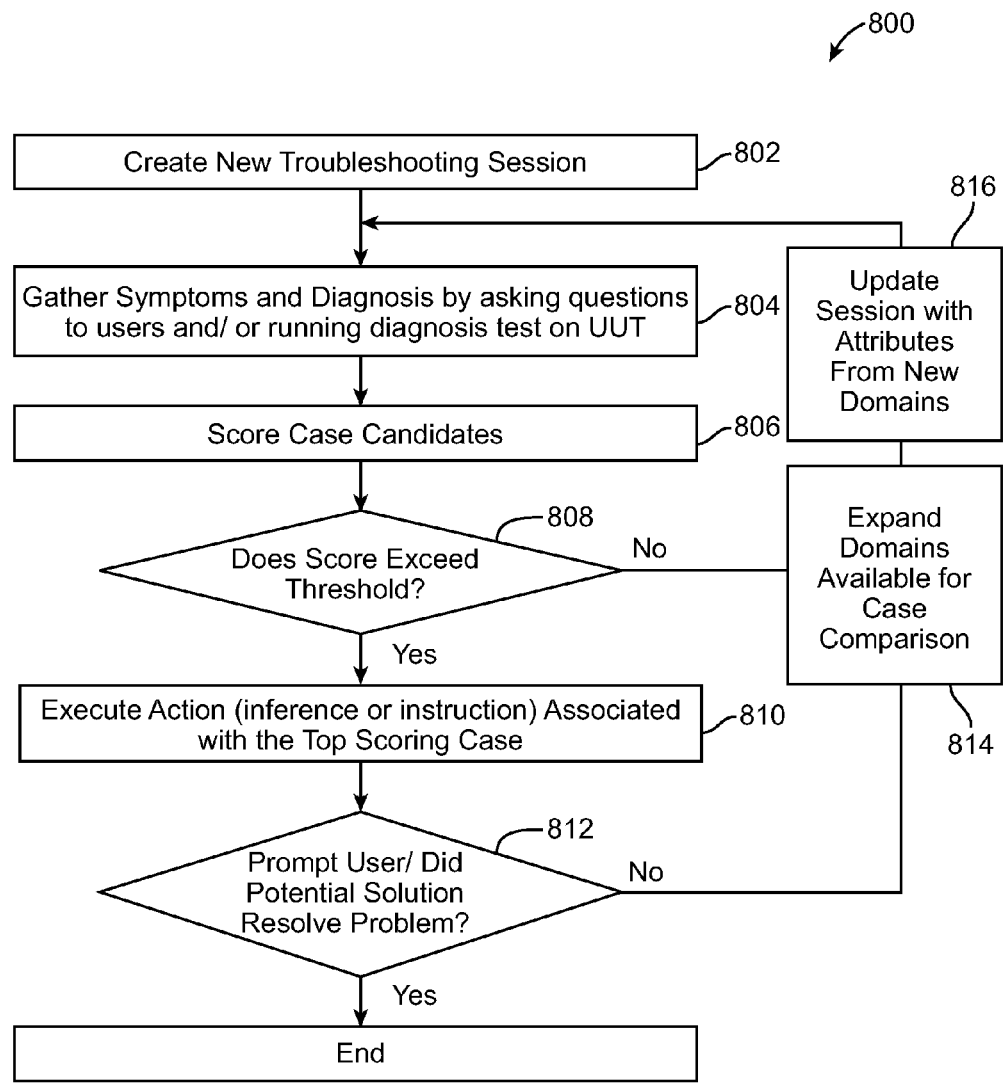
FIG. 8 illustrates a troubleshooting process according to some embodiments of the present technology.

FIG. 8 illustrates a troubleshooting process 800 according to some embodiments of the present technology. According to FIG. 8, a troubleshooting process 800 involves creating a new Troubleshooting Session 802, gathering symptoms and diagnosis by asking questions to users and/or running diagnostic tests on the UUT 804, scoring to find matching cases 806, and determining when one or more cases exceed the desired threshold or repeating the data gathering process 808. The process 800 also involves executing the action associated with the top scoring Case 810. This could be an inference that results in further execution in the reasoning engine or it could be an instruction for a user. Next, the potential solution is presented to the user and the user is prompted to confirm whether or not it resolved the problem 812.

In some embodiments, the process 800 is repeated either a viable solution has been implemented or the reasoning engine determines no solution is available in the existing case base. For example, the case candidates do not breach the threshold score of if a potential solution does not resolve the reported problem, the system can expand the domains available for case comparison 814 and update the session with the attributes from the new domains 816.

In some embodiments, the system will be designed to allow users to pause the process at any of the steps and resume at a later time.

Figure 9:
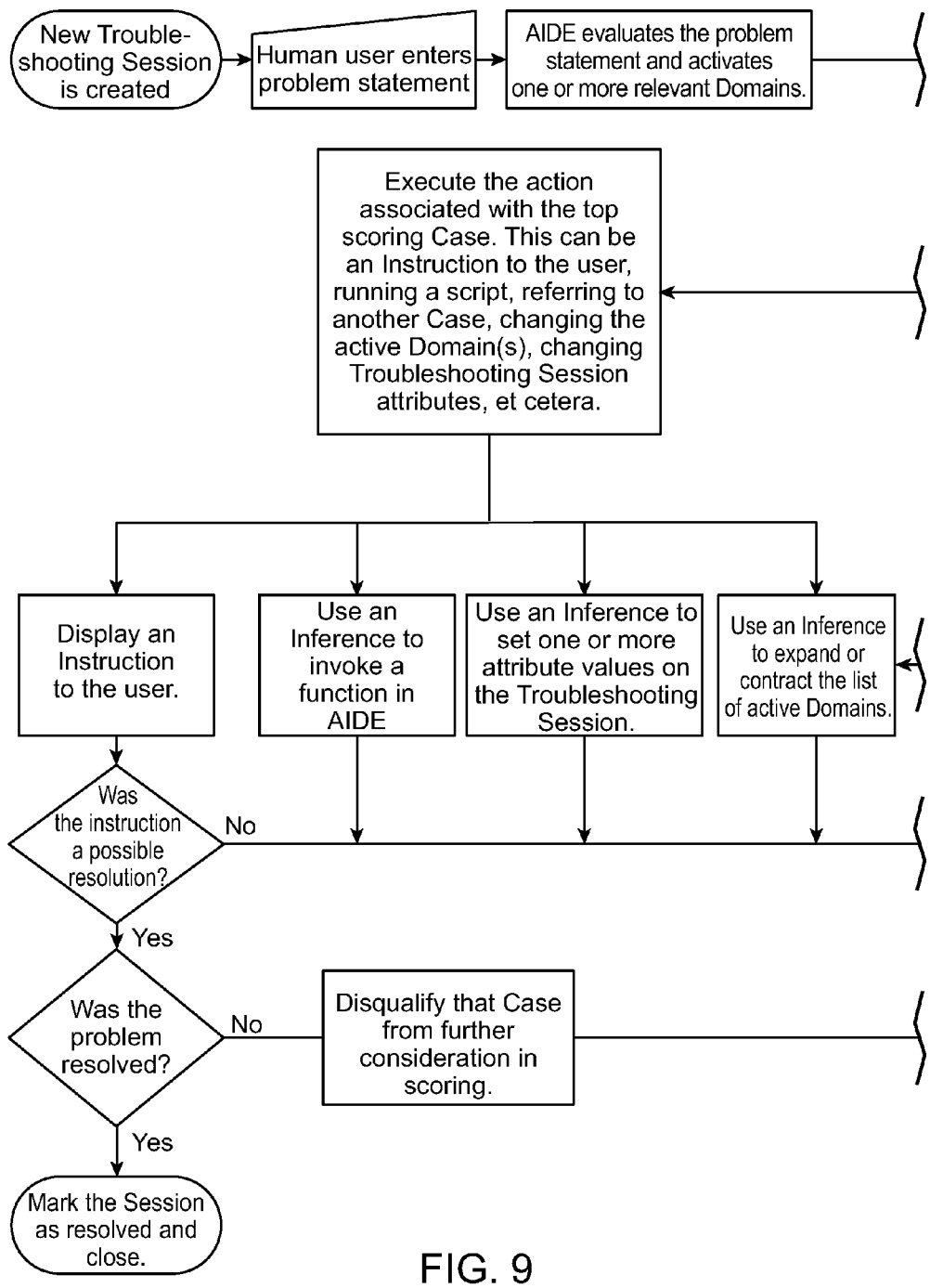
FIG. 9 illustrates another troubleshooting process according to some embodiments of the present technology.
Figure 9:
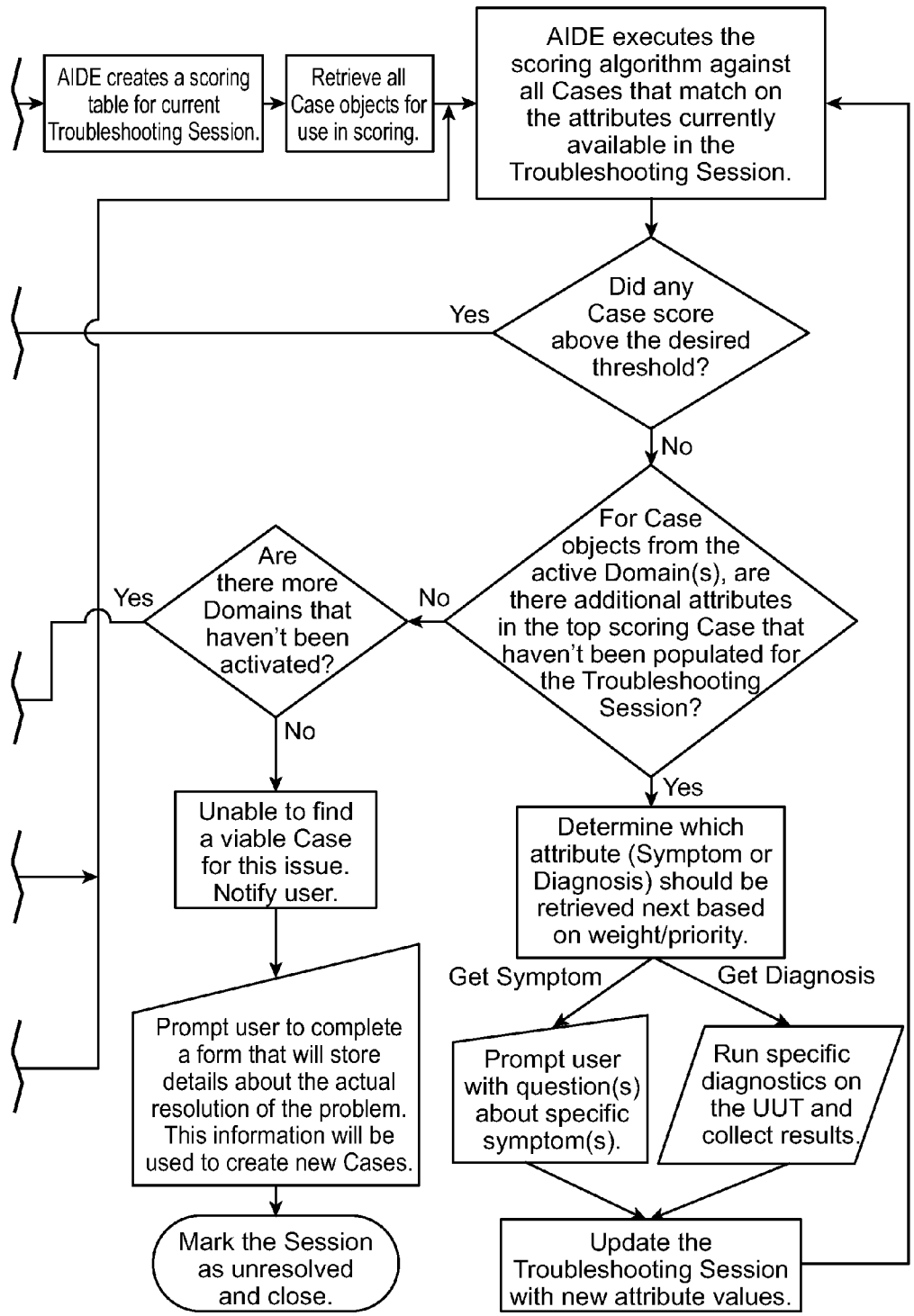

FIG. 9 illustrates another troubleshooting process according to some embodiments of the present technology.

Creating a Troubleshooting Session

A new Troubleshooting Session can be created either by connecting a UUT to the server when it's in diagnostic mode or by a technician (or other user type) creating a new Session manually from the diagnostic console. With either approach, the serial number of the UUT will be provided. The serial number will be matched with a model identifier which will be used as the input to the reasoning engine. A set of cases will be evaluated (using the diagnostic primitive) and a matching case is expected to pass threshold. The matching case will execute a set of general diagnostics to determine the state of the system and remediation steps.

If the operator supplies a problem statement, by selecting a predefined problem, the reasoning engine will run more specific tests on the UUT instead of general diagnostics stemming from the module identifier. Knowing the model of the unit and the problem statement will allow AIDE to focus on those cases most relevant to the problem at hand. For example, if the problem statement is "device won't turn on" and the serial number is for an iMac then the CBR engine will start by evaluating those cases that are in the "POWER" domain and disqualify any that are battery related (since an iMac doesn't have a battery).

Scoring

Figure 10:
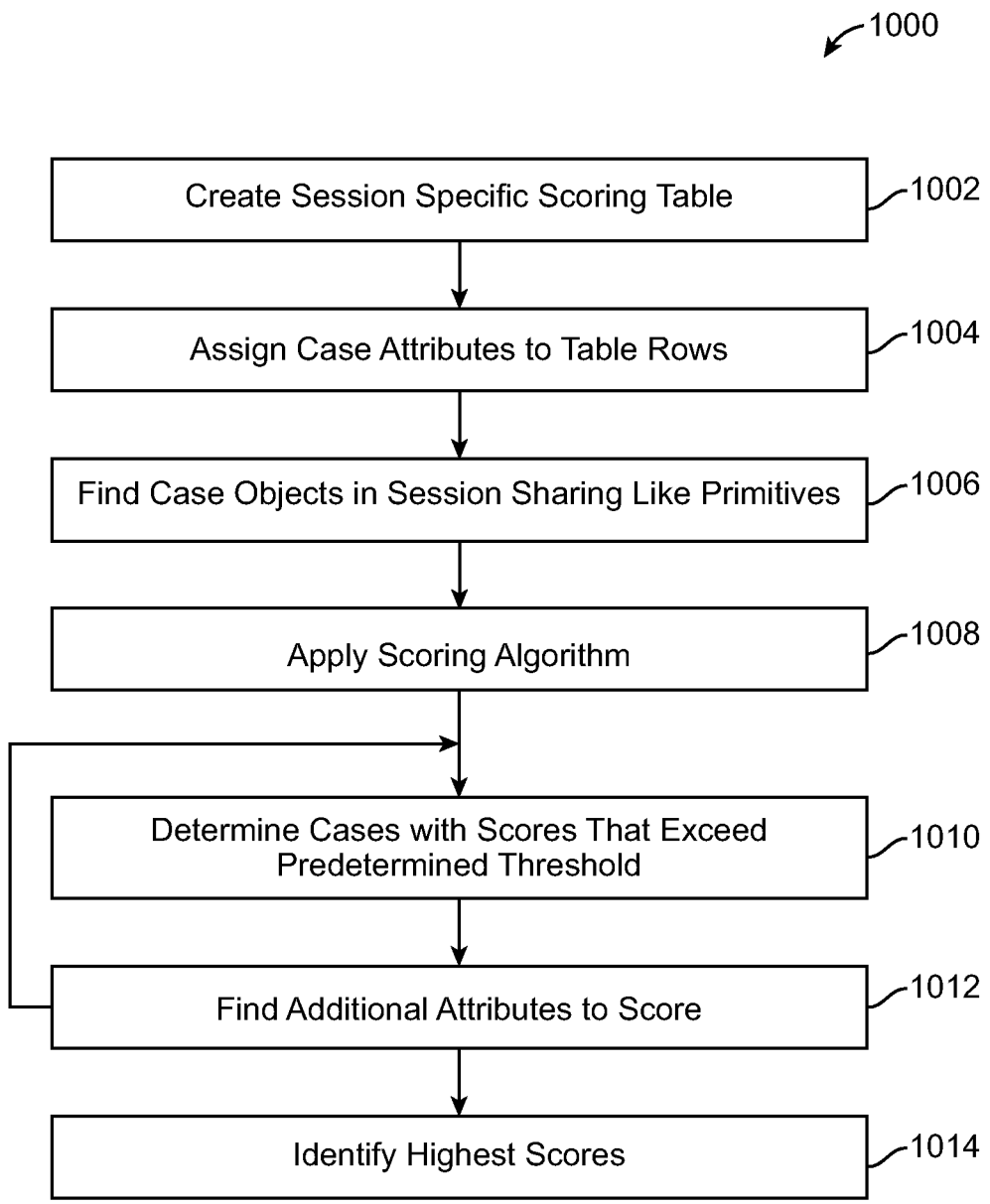
FIG. 10 illustrates an exemplary process of case scoring according to some embodiments of the present technology.

With every transaction, the CBR engine compares the primitive values of a session to all applicable cases in the casebase. A case is applicable when it contains the same primitive held by the session. Once cases are compared, for each primitive and the individual primitive score is calculated, the reasoning engine will aggregate the individual scores for each case to derive the score of the case. This multi step process is called case scoring. FIG. 10 illustrates an exemplary process 1000 of case scoring according to some embodiments of the present technology.

In some embodiments, the scoring process 1000 begins with a memory based scoring table being created to store the scores that correspond to a particular session 1002. Next, each score row/record will contain the ID of a Case, the score itself, and identifier of the primitive attribute it corresponds to (e.g. Symptom or a Diagnosis in FIG. 7 above) 1004. For each primitive in the session, a query is executed to find all the Case objects containing the same primitive 1006. Next, the process 1000 involves applying a scoring algorithm 1008.

Some embodiments use an algorithm that compares the actual value(s) in the Session to the expected value(s) in the Case and then multiplying that value by the weight of that attribute, a score is calculated. To 'score' a non-numeric primitive, the engine will calculate the weighted likelihood as the interception between the input and the expected value divided by the number of expected values. Some embodiments involve the following optimized version of this algorithm is devised for high throughput and performance:

$$\text{Primitive\_Score} = [(\text{Input\_Values} \cap \text{Case\_Values})/\text{Case\_Values}] * \text{weight}.$$

For example, if the case has an attribute with a weight of 75% and is expecting the values {A, B, C, D, F} and the session has the values {D, E, F} for that same attribute then there would be two matches (D and F) so the score would be calculated as (2/5)*0.75=0.3

Next, the process 1000 continues with identifying cases having scores that exceed a predetermined threshold 1010. In some cases, the scoring process repeats until all of the attributes in the Session have been accounted for. When completed, it's possible for the same Case to appear multiple times in the scoring table if that Case has more than one attribute that matches the attributes of the Troubleshooting Session.

The system will then sum the scores for each Case with at least one row in the scoring table. The aggregate score allows the CBR engine to determine which Cases could be the most likely match. The goal is to find at least one Case from the active Domain(s) that exceeds a predefined score threshold that would cause the system to execute that case action. In some cases, this threshold is another attribute of the Case itself (so the passing threshold will vary between case objects). In some instances, it is possible the highest scoring case is not from one of the active domains. Those cases would not be allowed to trigger an instruction unless there were no viable candidates from the active domains; when that happens the reasoning engine could choose to add additional domains to the active list.

The process 1000 can then find additional attributes to score 1012. In some embodiments of the present technology, after the initial scoring pass it is unlikely that a best match will be found since (at that point) the Troubleshooting Session will contain limited data. As such, AIDE will want to retrieve additional attributes to find an appropriate match. The additional attributes will be either Symptoms (typically retrieving by asking questions of the user) or Diagnosis (retrieved by running Diagnostics or Diagnostic Sets).

In some embodiments, the attributes that the system will request next will be based on the top scoring cases that are from the active domain(s). Out of those cases, the system will look for the highest weighted attribute from the case(s) that is not currently populated in the session. For attributes that are driven by tests or Lua scripts, AIDE will choose the only one from the top scoring case. For attributes that are based on questions asked to human users, AIDE might select multiple questions to pass to the user. Only cases within the activated domains will be participating in the interactive dialogue and Lua script execution. However, all cases will be scored regardless of their domain.

The process 1000 can loop until the highest scores are identified 1014. For example, when a response to the question or result of the test is received, the scoring process will execute again. The calculations only need be done for the newly retrieved attributes or any user or system overrides to previous attributes. The scoring table will retain the scores from the previous attributes. After the scores are added the order of the cases in the scoring table will be reconstructed. In some cases, it is possible that a case that was at the top after the previous step is pushed down several spots and another case emerges as the top contender. However, if none of the cases exceed the desired threshold then the process will continue in a loop until one does.

Execution of Instructions

In some embodiments of the present technology, once one or more cases exceed their threshold, AIDE will attempt to execute the instruction associated with those case objects or an inference. For example, an instruction can instruct to the user to do something or the UUT to perform an action. Likewise, an inference can results in adding or removing domain objects from the active Domain list or in explicitly changing one or more attribute values in the session. For example, if symptoms contradict diagnostic results then AIDE might give more weight to the human input. For example, a diagnostic indicated the UUT had no power but the human user can see that lights are on. In such a situation, an inference might be used to nullify the test result attributes to prevent them from influencing the scoring process. If the action initiated by the system was an instruction for the user, AIDE will wait to find out the result. If the action was an inference then after the corresponding changes take place, (e.g. adding/removing Domains, changing attribute values, etc.), the reasoning engine will go back to scoring and attribute gathering loop.

Case Generation

In some embodiments of the present technology, the AIDE system employs supervised machine learning to generate new, unknown classes of root causes from raw data in a diagnostic repository. The generative process works in conjunction with the CBR system to add new cases in the appropriate domains. It is possible to generate cases in a unsupervised fashion, or using an approval step before a generated case is published for diagnostic use.

Some embodiments involve supervised learning models that accept input from statisticians, technicians, and domain experts familiar with the scientific characteristics of the raw data. The supervisors extract feature vectors that can generalize raw data from a training data set to predict either class membership (classification) or quantitative values (regression) from unseen new raw data.

Some embodiments involve multivariate regression functions using multiple predictors. Multivariate statisticians or machine learning data scientists can manipulate multivariate data in these high dimensional features space and build predictive models. Technicians know how to interpret the final predicted results to their clients and help them to diagnose and remediate issues with electronic devices. AIDE is designed to encapsulate the knowledge of domain experts, data scientists and technicians by mapping raw data to feature space (models space) to output prediction results.

Some embodiments involve principal component analysis—a technique from statistics for simplifying a data set. The aim of the principal component analysis method is to reduce the dimensionality of multivariate data whilst preserving as much of the relevant information as possible.

In some embodiments, data is represented in figures, feature vectors, graphs, etc., and the data can be linked from raw data to a feature space to a prediction. The implementation relies on a data structure that converts a training or prediction instance vector to form arrays of objects or super-structures. During the construction of the data pipelines, mapping structures that connect these arrays of objects (data and graphical objects) have been recorded and stored inside these figures.

In some embodiments, there are two types of graphical objects users can pick from:

1. Point(s) or curve(s) objects. Each picked object from each of the three stages of graphs (raw, feature vectors or predictions) will be used to show their respective identities in other (two) figure(s) (marking mode). Special algorithms will be developed for picking curves or lines and identifying groups of point (or curves); and 2. Raw data graph usually only appear in the marking mode and should be represented in a most relevant visualization format so that a domain expert can easily recognize their characteristics.

Feature Space

1. Subgraphs. In this stage, each feature forms a subgraph. The subgraph encapsulates the distribution of each class' training instance in different columns parallel to each other while the whole prediction instances are grouped in single column of points. In a high dimensional dataset with highly sparse matrix, the showing of which subset of features into separate subgraph would need to be automatically adjusted based on prediction data set.

2. Dimensionality reduction. The output of the principal component analysis stage is to show the training and prediction instances in 2D or 3D figures together with the corresponding decision planes for the selected principal components.

3. Evaluation. A confidence measure for each prediction will be generated by comparing it with the ground truth.

Case/Symptom Generation

High confidence predictions will be candidates for case generation. The delta between the features from the predictions and the known CBR symptoms/diagnostics will introduce new symptom candidates. Each new symptom will can be assigned a human readable description before it can be incorporated in the case database.

Ending a Session

In some embodiments, when one or more cases exceed their threshold, AIDE will offer the solutions associated with those cases to the user. The user may accept one of the solutions or reject them. If a solution is accepted the system will automatically mark the session as closed. If none of the proposed solutions solved the problem the user many close the session and mark it as unresolved. In some cases, there will be scenarios where AIDE cannot find any Cases that offer a viable solution to a problem. When that happens it is especially important for the user to add commentary so that the AIDE administrators can review it later and determine how to improve the reasoning system.

Figure 11:
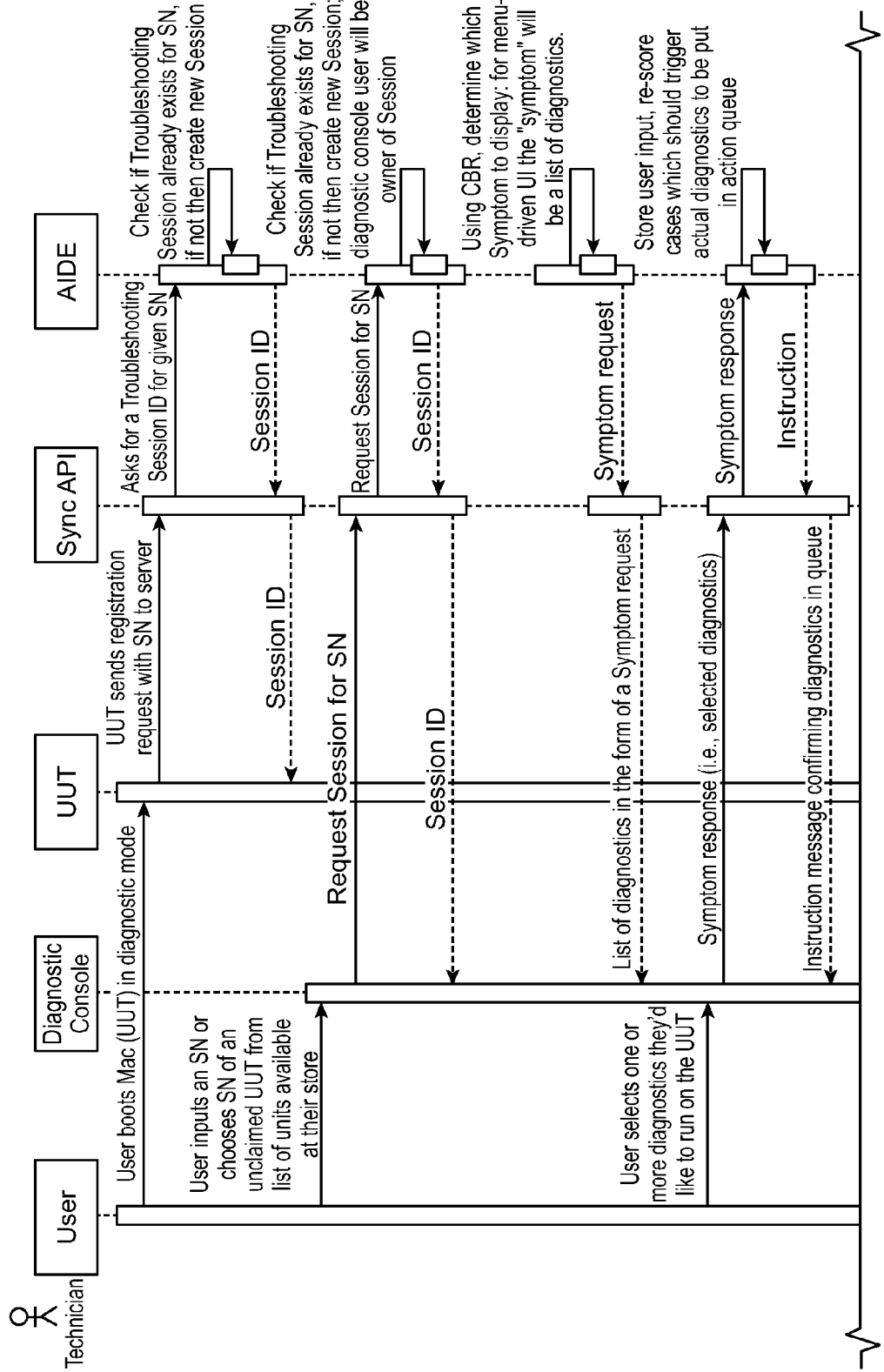
FIG. 11 illustrates an exemplary troubleshooting session according to some embodiments of the present technology.
Figure 11:
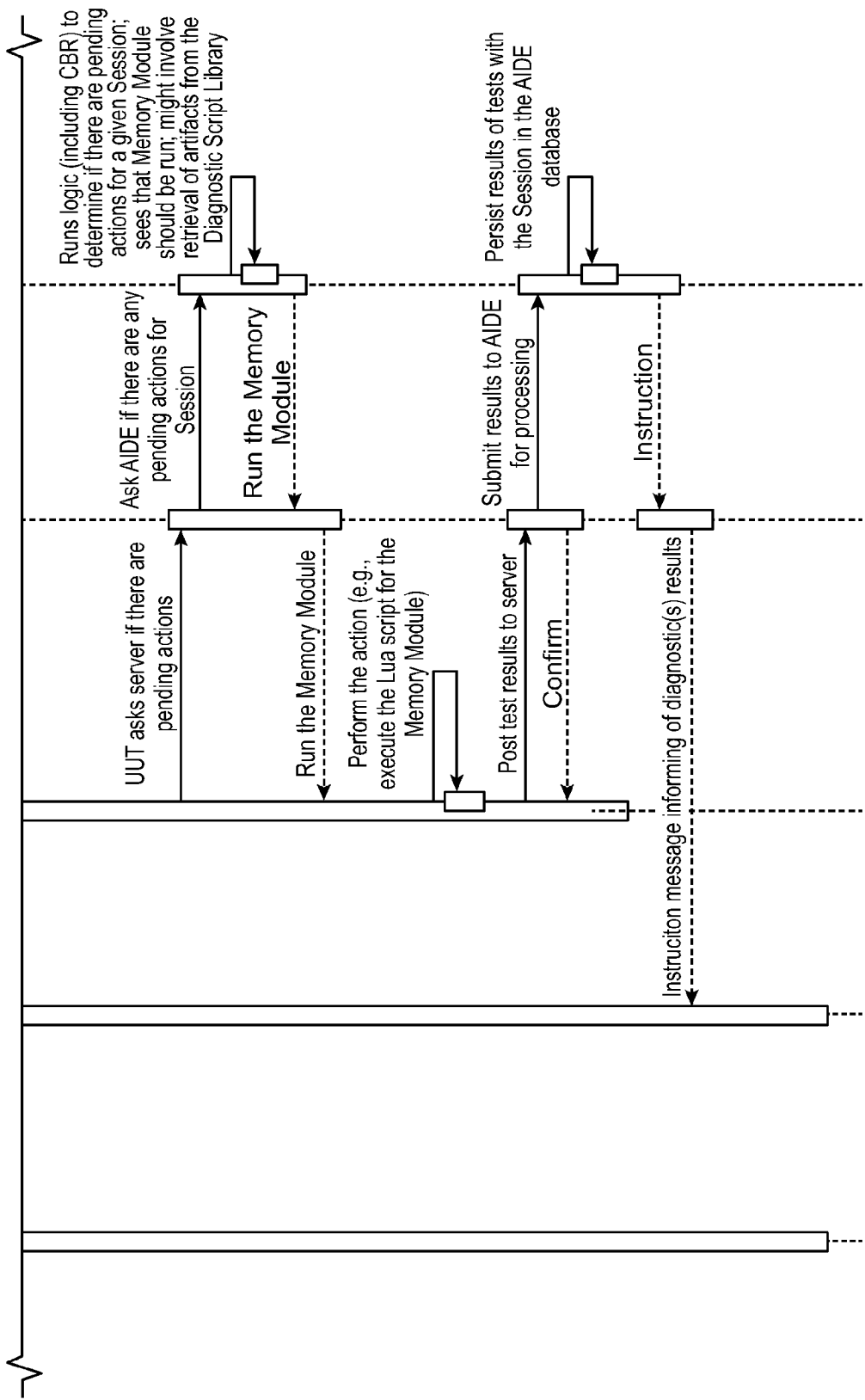

FIG. 11 illustrates an exemplary troubleshooting session according to some embodiments of the present technology.

FIGS. 12-26 illustrate graphical user interface (GUI) elements from an exemplary troubleshooting session according to some embodiments of the present technology.

Figure 12:
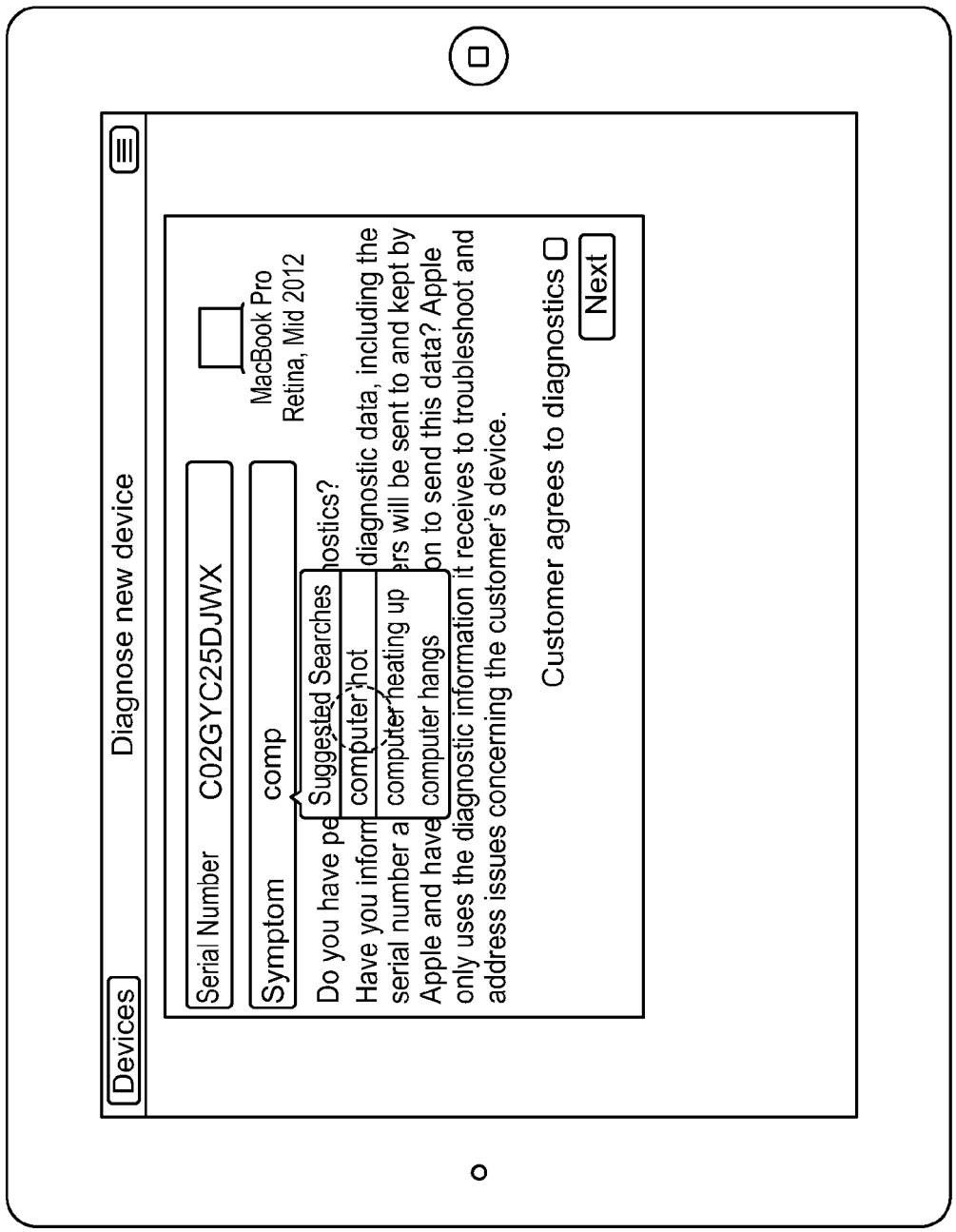
FIG. 12 illustrates graphical user interface elements from an exemplary troubleshooting session according to some embodiments of the present technology.

FIG. 12 illustrates a tablet computer with interface elements for accepting the entry of a serial number and a symptom. The serial number can the serial number of the tablet itself or that of another computer. As shown in FIG. 12, a serial number of a laptop is input into the GUI and the tablet computer is being used to diagnose a laptop computer coupled thereto. Additionally, the user of the tablet has indicated a symptom of the laptop. The GUI also displays a request for authorization from the user to initiate a troubleshooting session.

Figure 13:
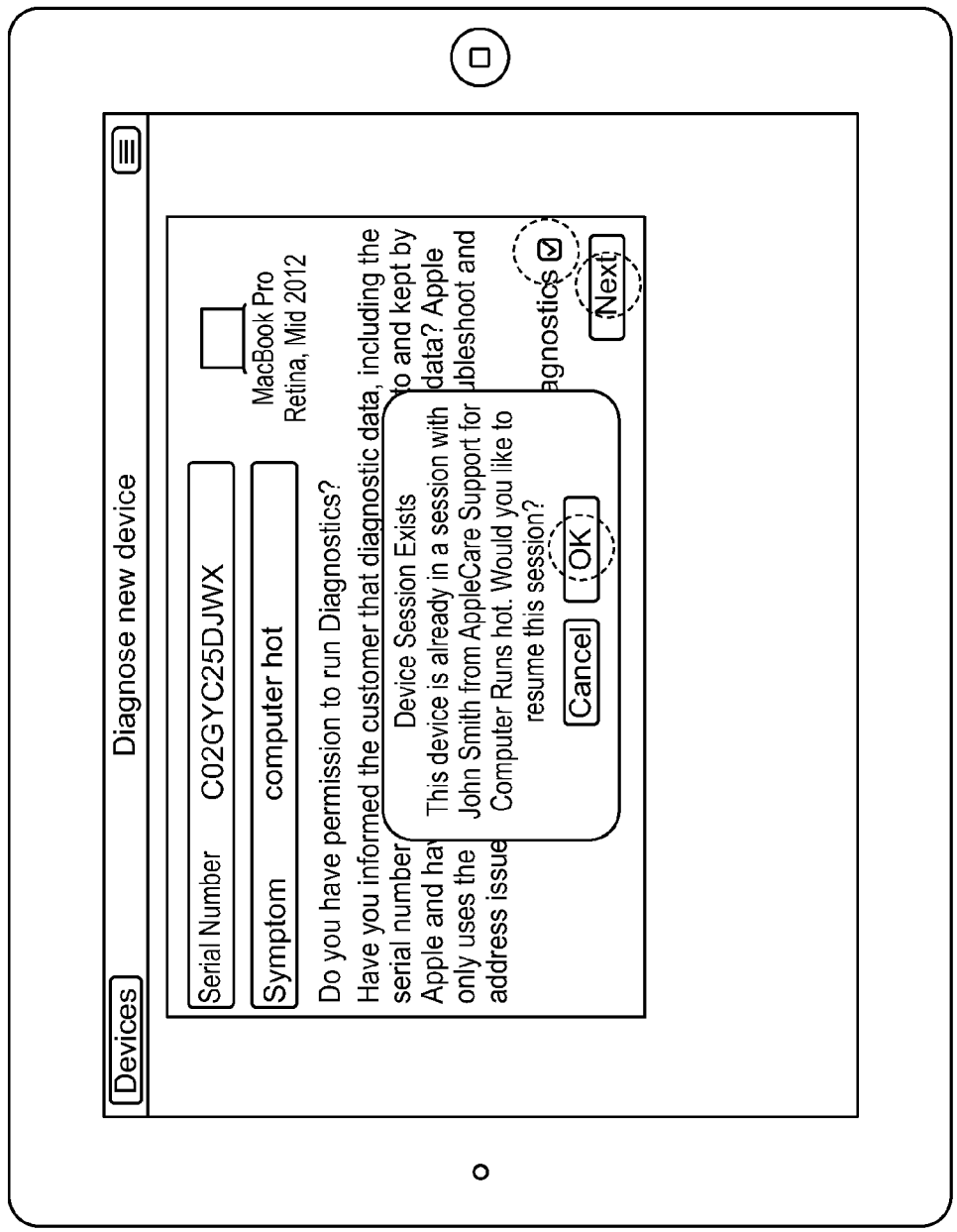
FIG. 13 illustrates graphical user interface elements from an exemplary troubleshooting session according to some embodiments of the present technology.
Figure 14:
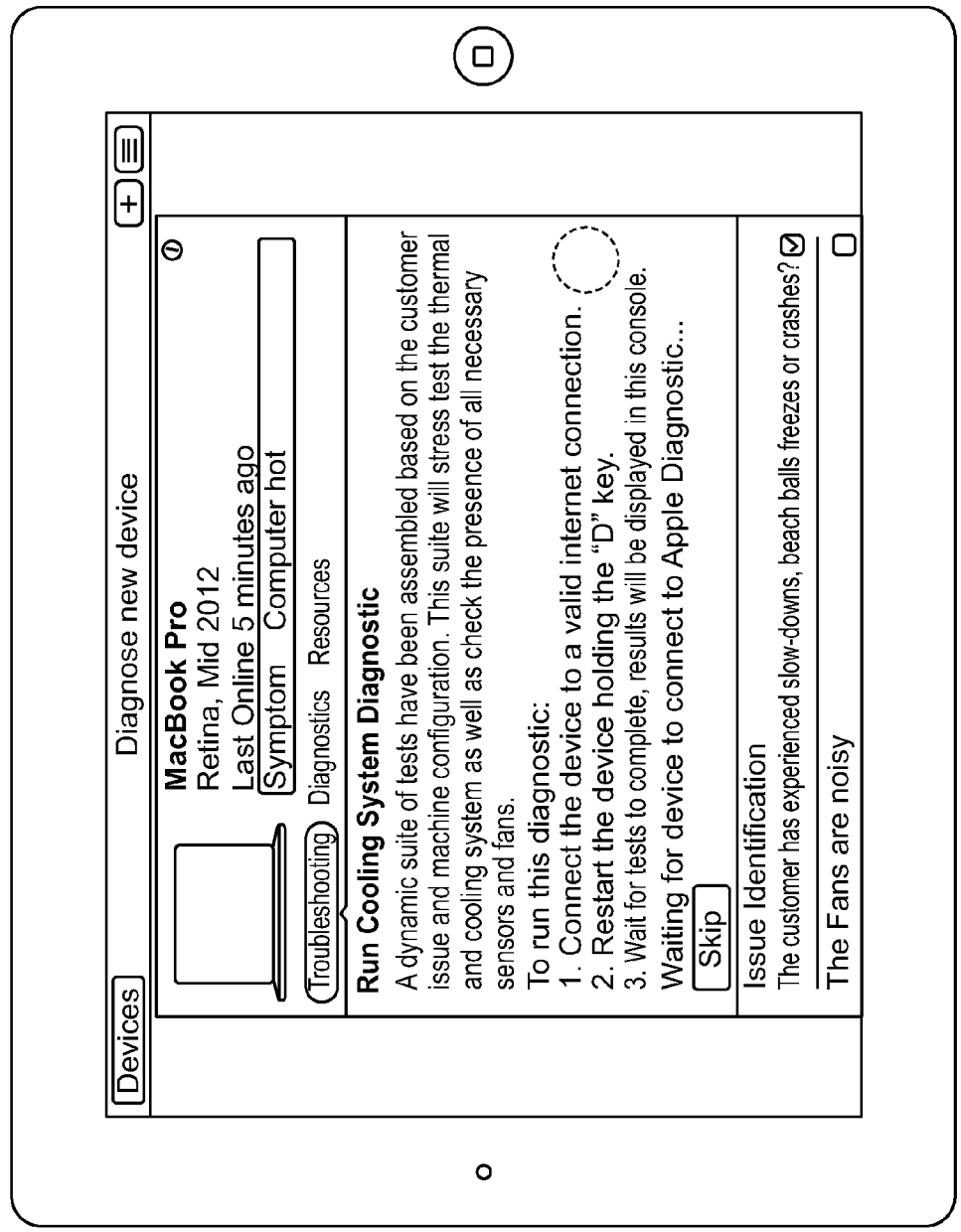
FIG. 14 illustrates graphical user interface elements from an exemplary troubleshooting session according to some embodiments of the present technology.
Figure 15:
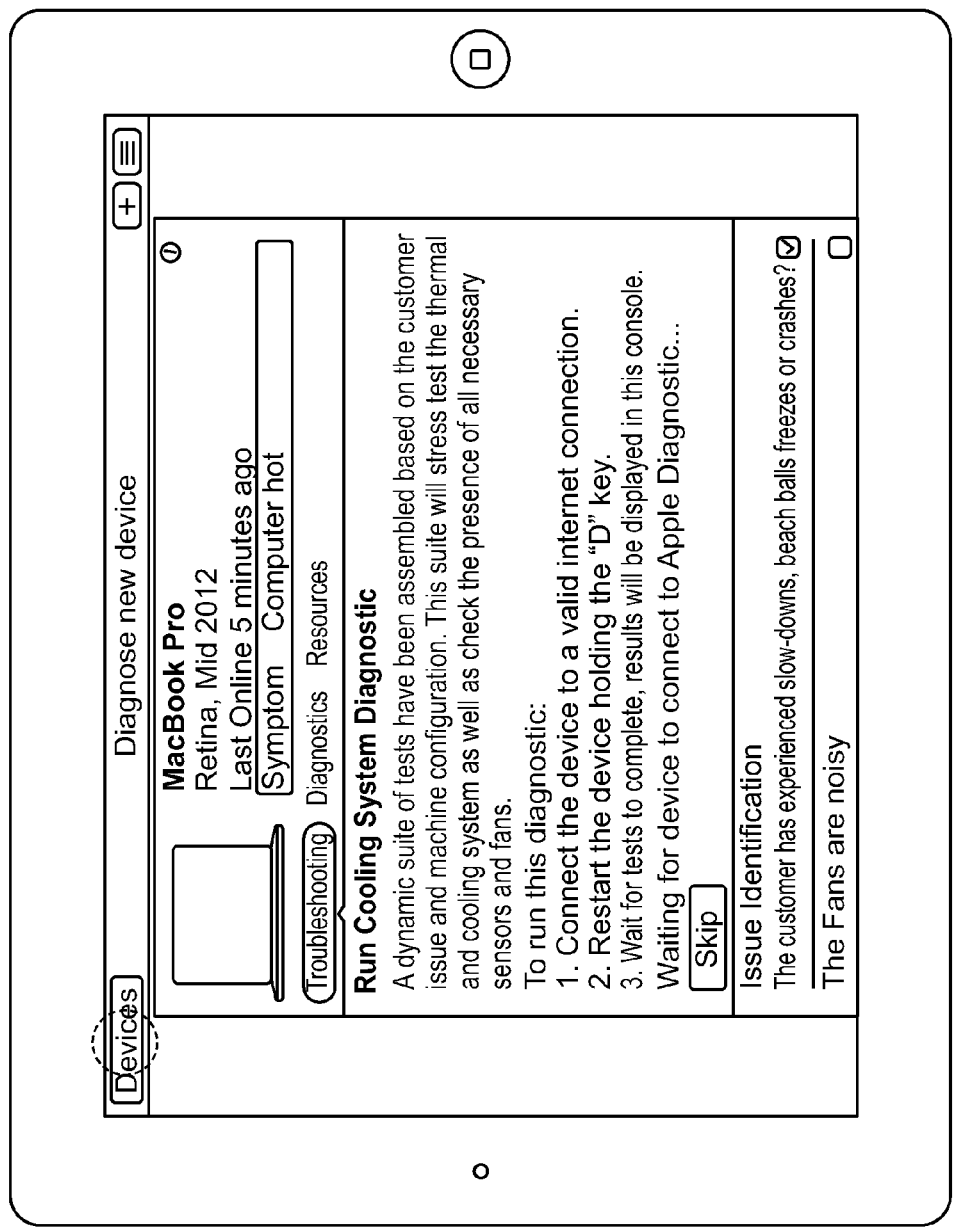
FIG. 15 illustrates graphical user interface elements from an exemplary troubleshooting session according to some embodiments of the present technology.
Figure 16:
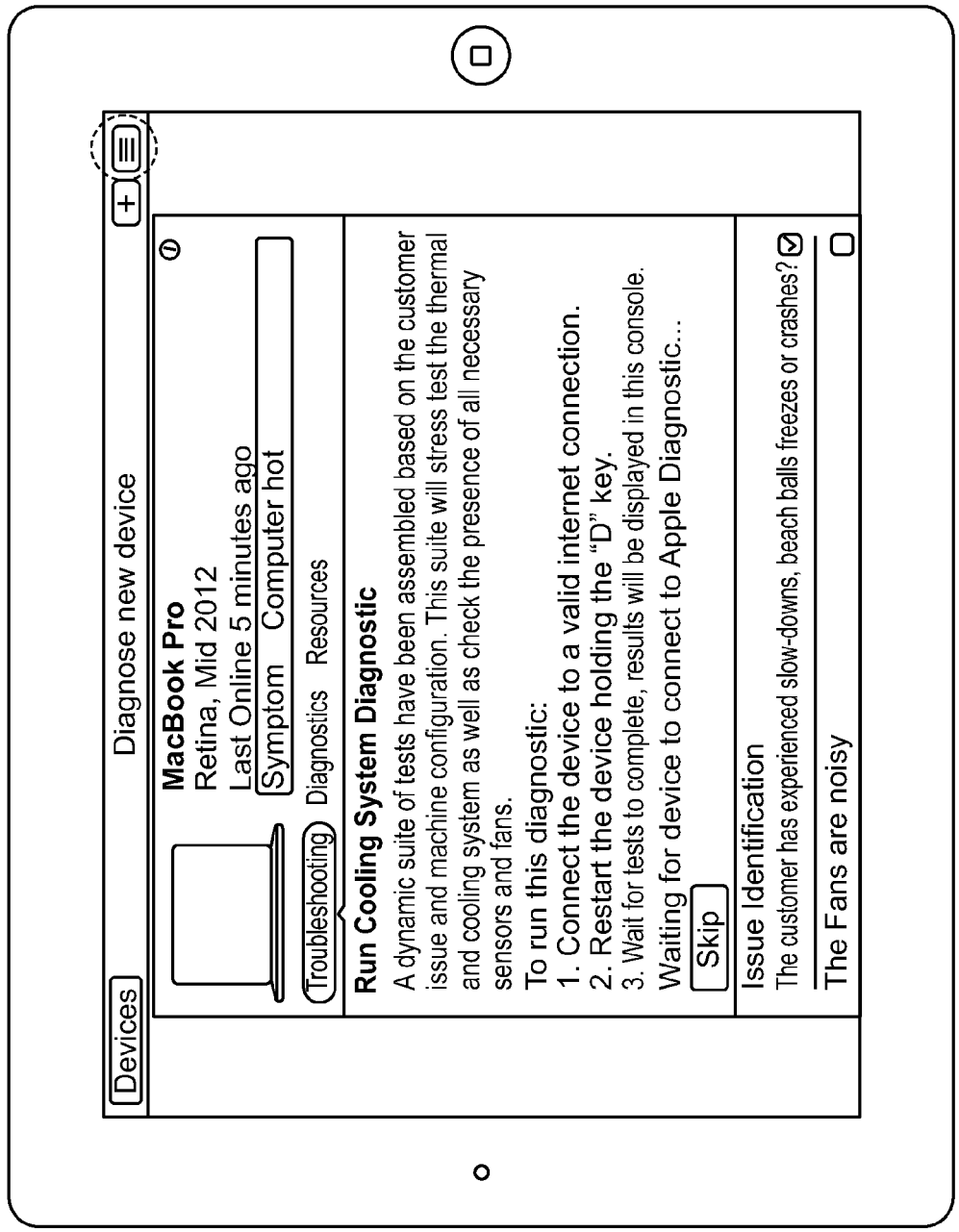
FIG. 16 illustrates graphical user interface elements from an exemplary troubleshooting session according to some embodiments of the present technology.
Figure 17:
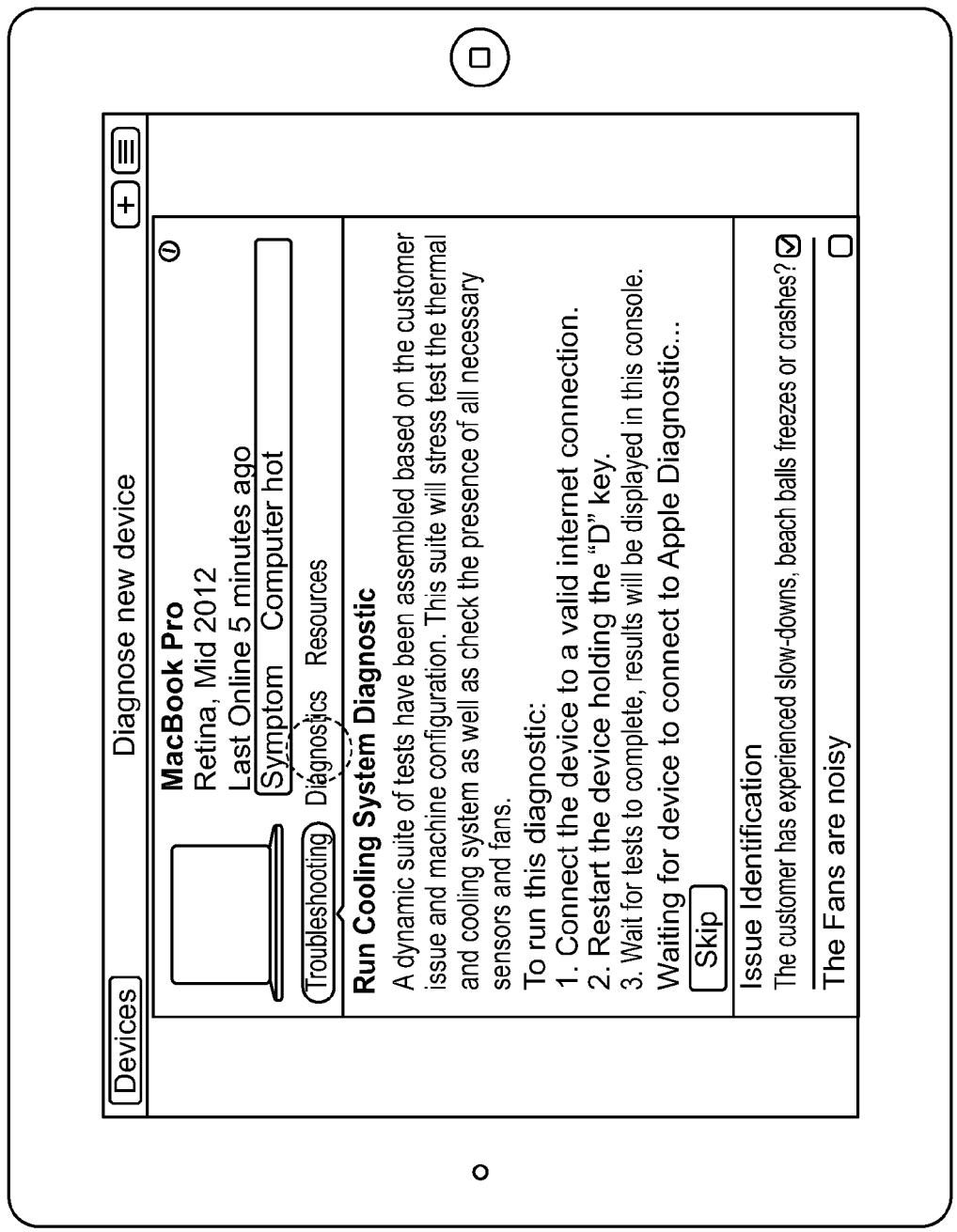
FIG. 17 illustrates graphical user interface elements from an exemplary troubleshooting session according to some embodiments of the present technology.

FIG. 13 illustrates the tablet computer with an interface element notifying the user that the laptop device (identified by the serial number) is already in a session with another device/user. Indeed, the interface element allows the user of the tablet to take over the current session. In some embodiments, the user of a device previously in-session with the device can be notified that they have been logged out of the session.

Figure 19:
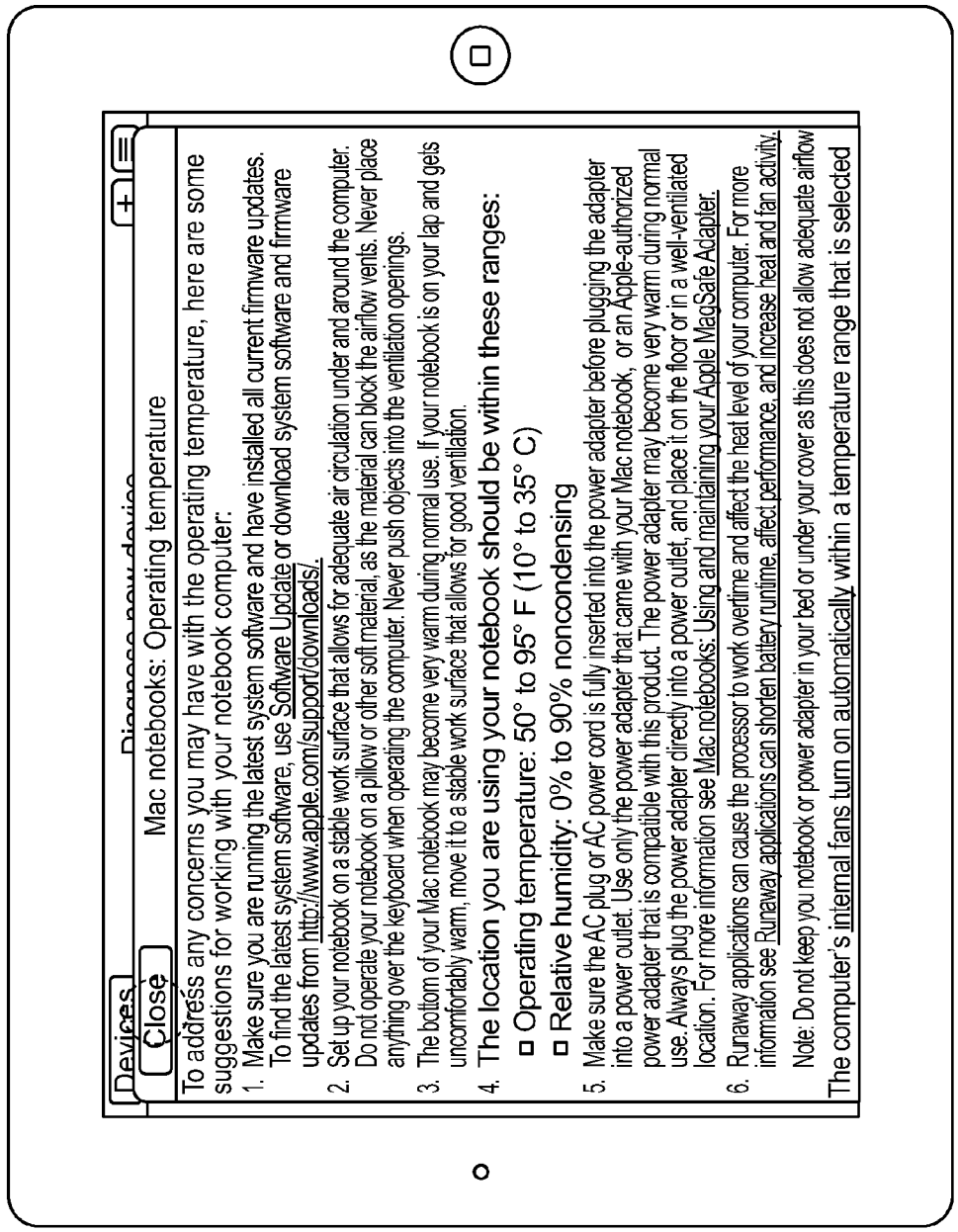
FIG. 19 illustrates graphical user interface elements from an exemplary troubleshooting session according to some embodiments of the present technology.
Figure 20:
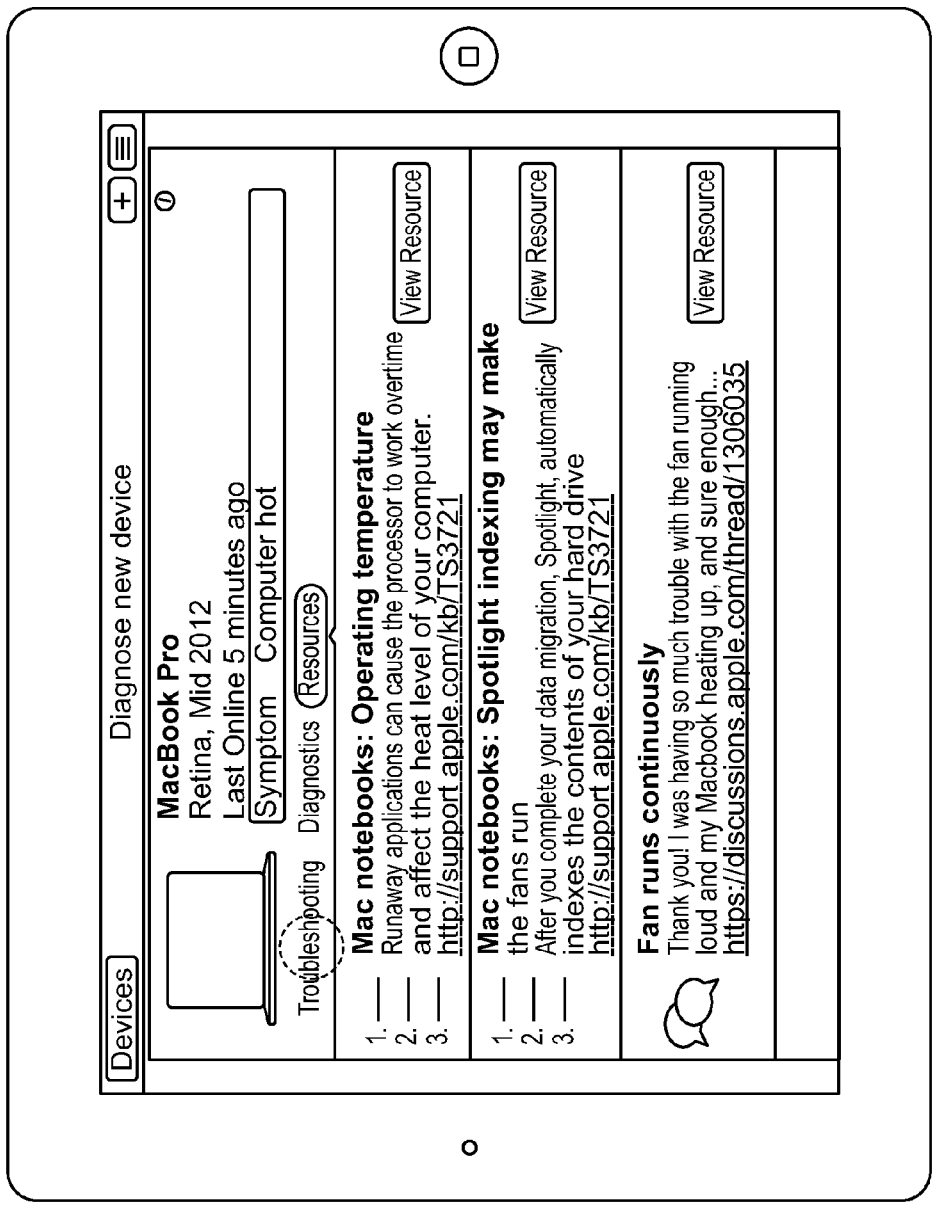
FIG. 20 illustrates graphical user interface elements from an exemplary troubleshooting session according to some embodiments of the present technology.

FIGS. 14-17 illustrates a troubleshooting homepage for a troubleshooting session with the laptop computer. In some embodiments, the troubleshooting homepage can include tools for a user to provide feedback about a problem (e.g. "Are the Fans Noisy?") based on an instruction from the AIDE system that was identified by calculating the probabilities of inputs, as explained above. In some embodiments, a interface tool (displayed in the upper right hand corner) can be used to list information known about the UUT. The user can interact with the list to get more information, override symptoms, etc. The troubleshooting homepage can also list potential root causes to the symptom and can provide the user with a roadmap of steps for addressing the problem based on the probabilities, as explained above. Also, as shown in FIG. 19, the graphical user interface can display suggestions for addressing the identified problem. FIG. 20 illustrates a resource page displaying resources to provide the user with information about the identified problem. In some embodiments, the resources can include documents, videos, etc. stored in an analytic database.

Figure 18:
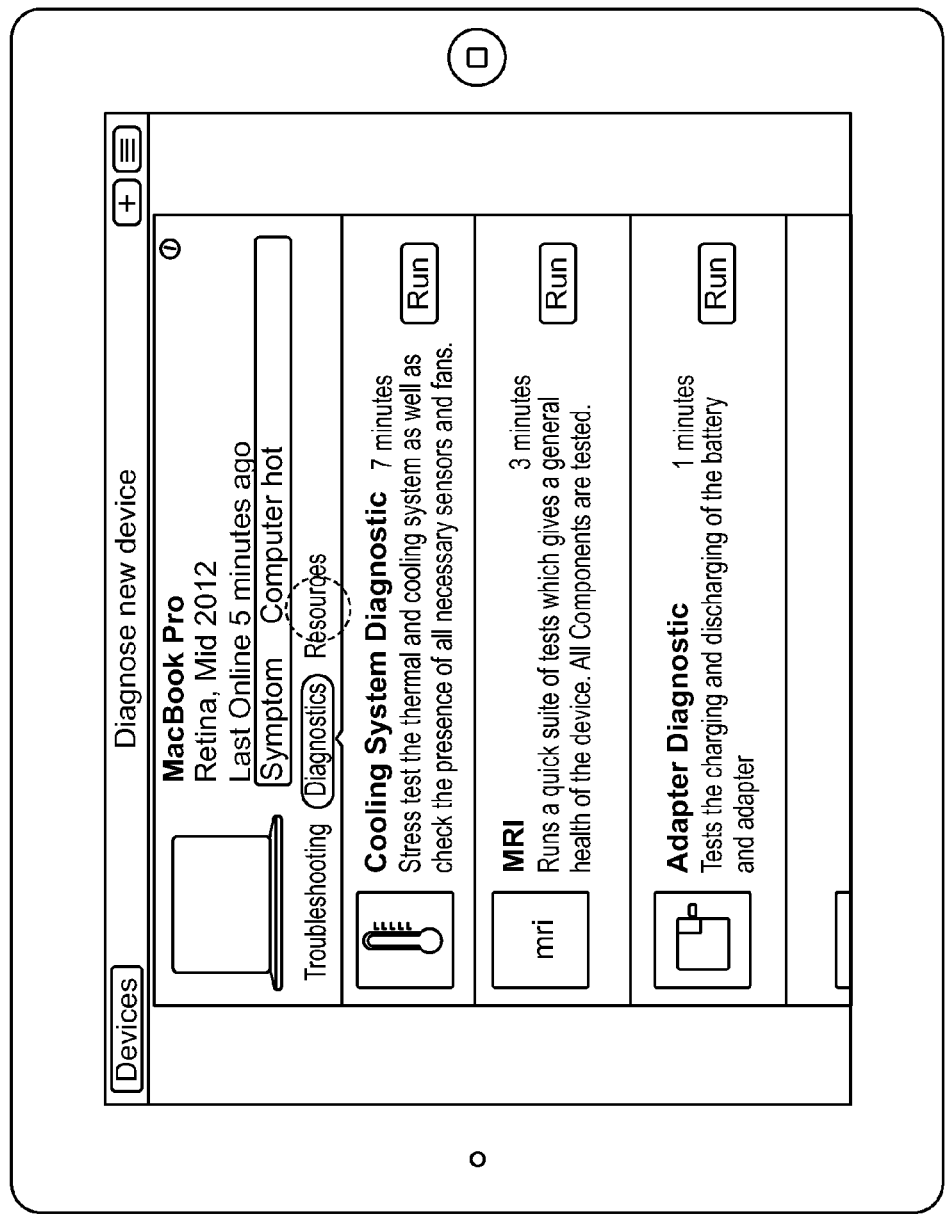
FIG. 18 illustrates graphical user interface elements from an exemplary troubleshooting session according to some embodiments of the present technology.

In some embodiments, the device running the troubleshooting session can be in-session with more than one UUT. FIG. 18 illustrates a diagnostic homepage listing a plurality of diagnostics, tests, suggestions, requests for feedback, etc. In some embodiments, the diagnosis are available by sending the AIDE system a request, the AIDE system packaging and securing a script, the user device downloading the script, and the UUT executing local programs for interpreting the scripts and running the tests.

Figure 21:
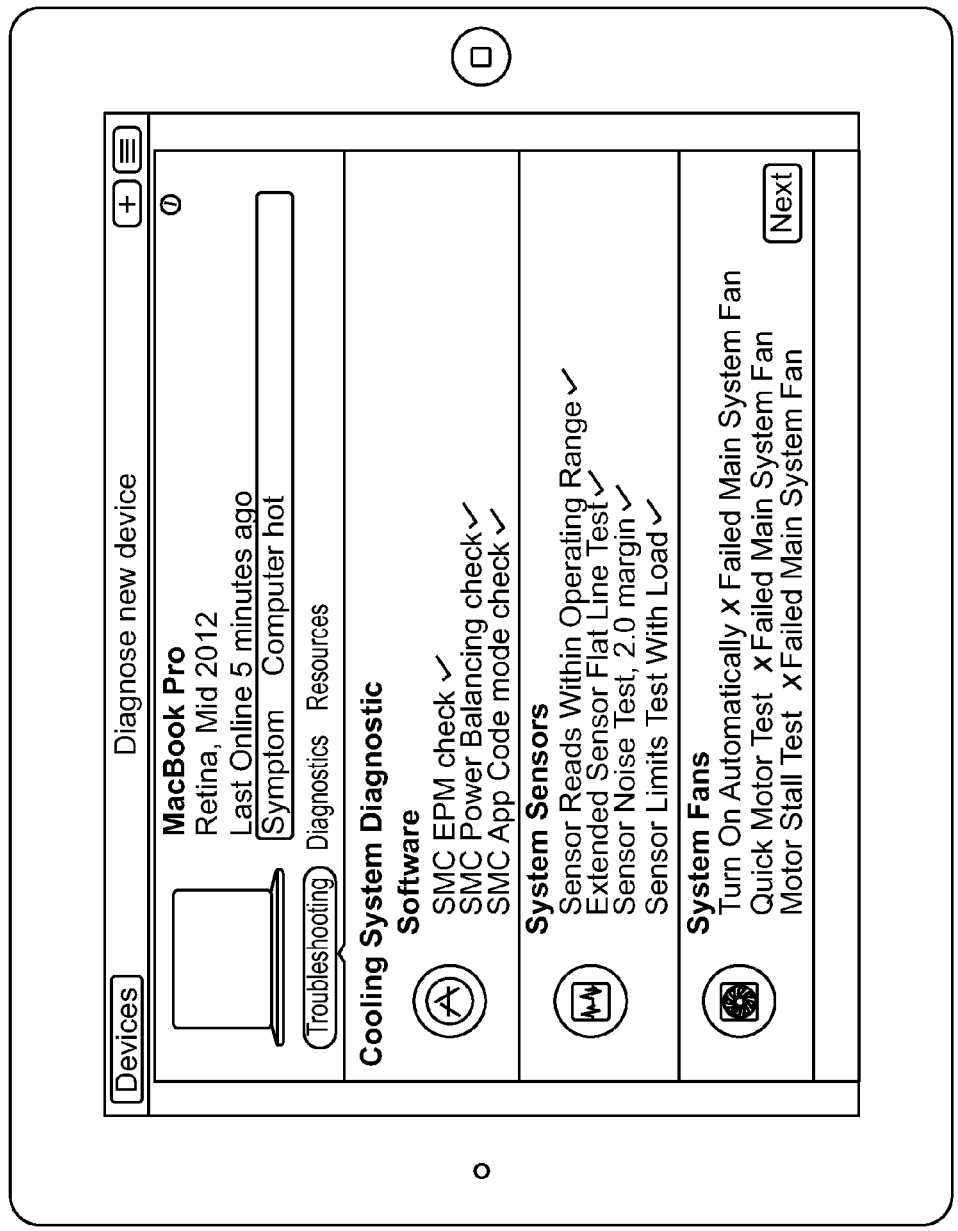
FIG. 21 illustrates graphical user interface elements from an exemplary troubleshooting session according to some embodiments of the present technology.
Figure 22:
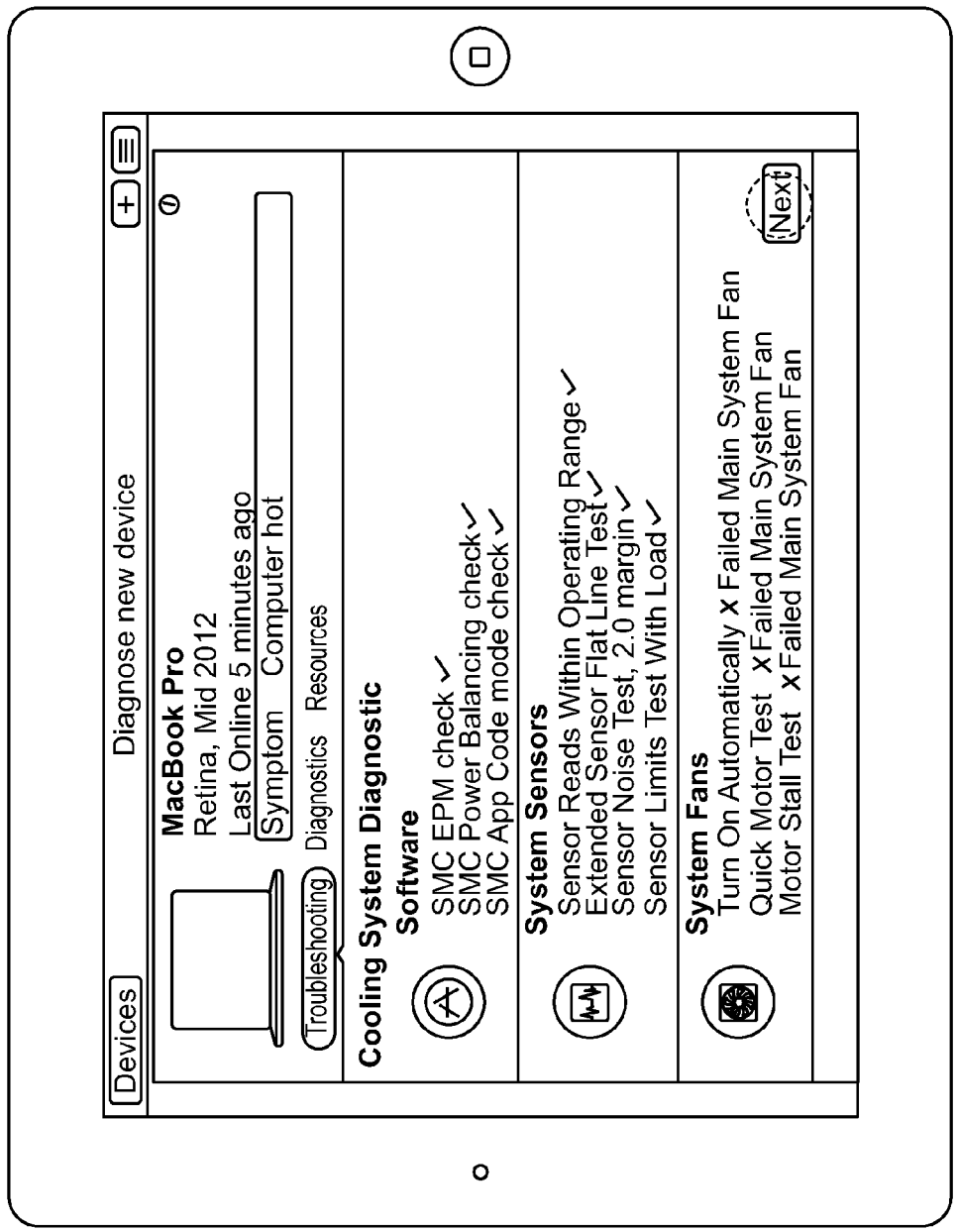
FIG. 22 illustrates graphical user interface elements from an exemplary troubleshooting session according to some embodiments of the present technology.
Figure 23:
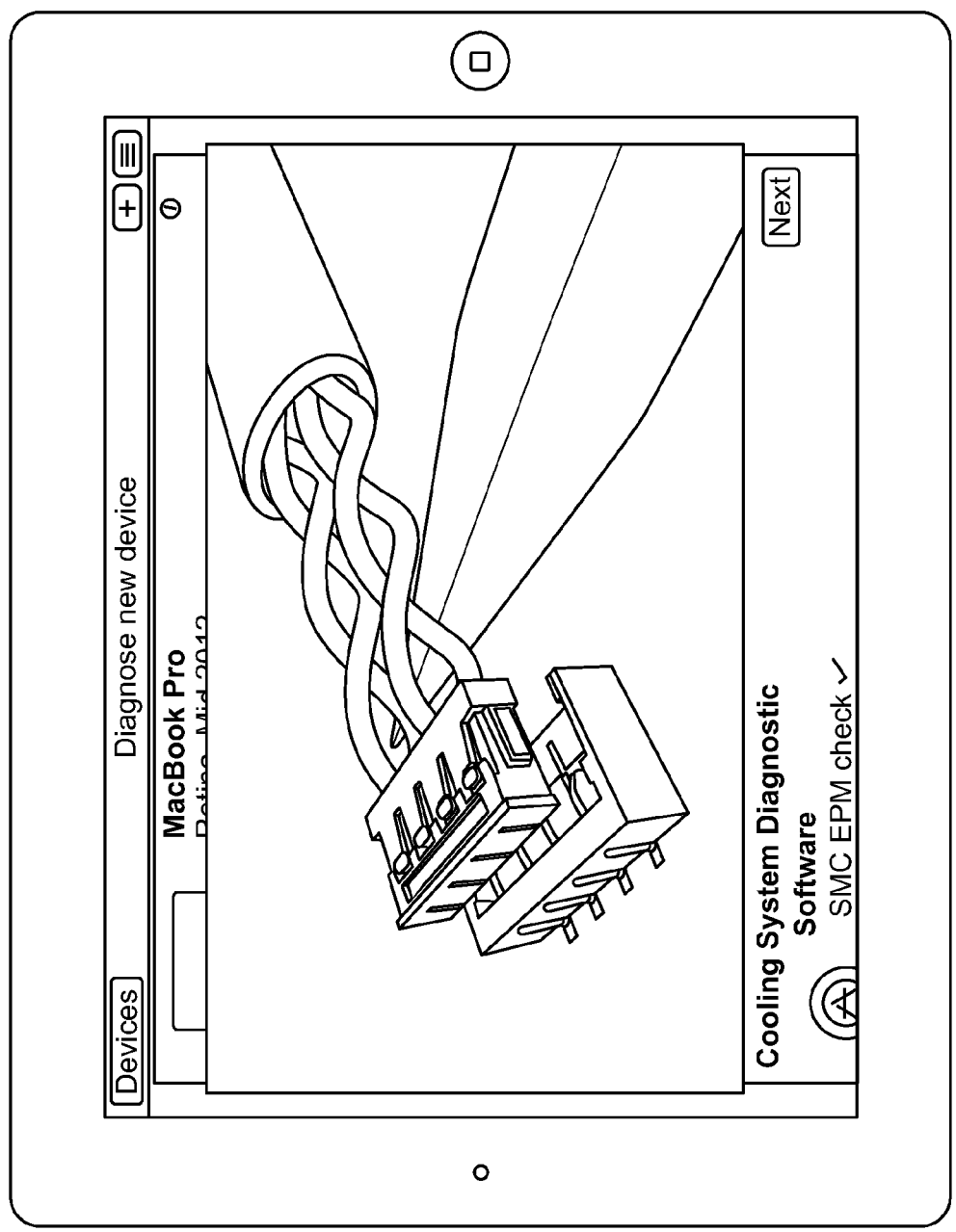
FIG. 23 illustrates graphical user interface elements from an exemplary troubleshooting session according to some embodiments of the present technology.
Figure 24:
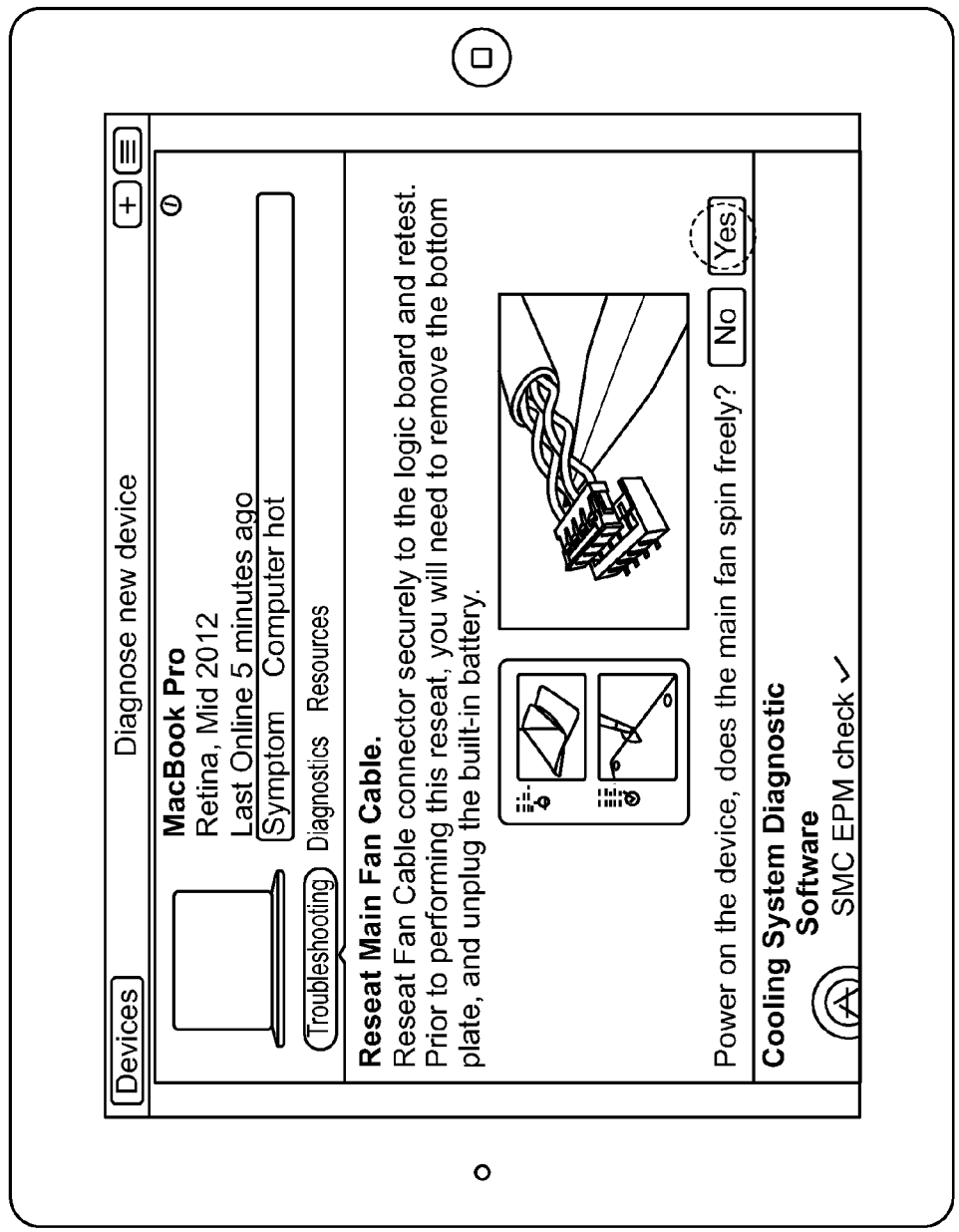
FIG. 24 illustrates graphical user interface elements from an exemplary troubleshooting session according to some embodiments of the present technology.
Figure 25:
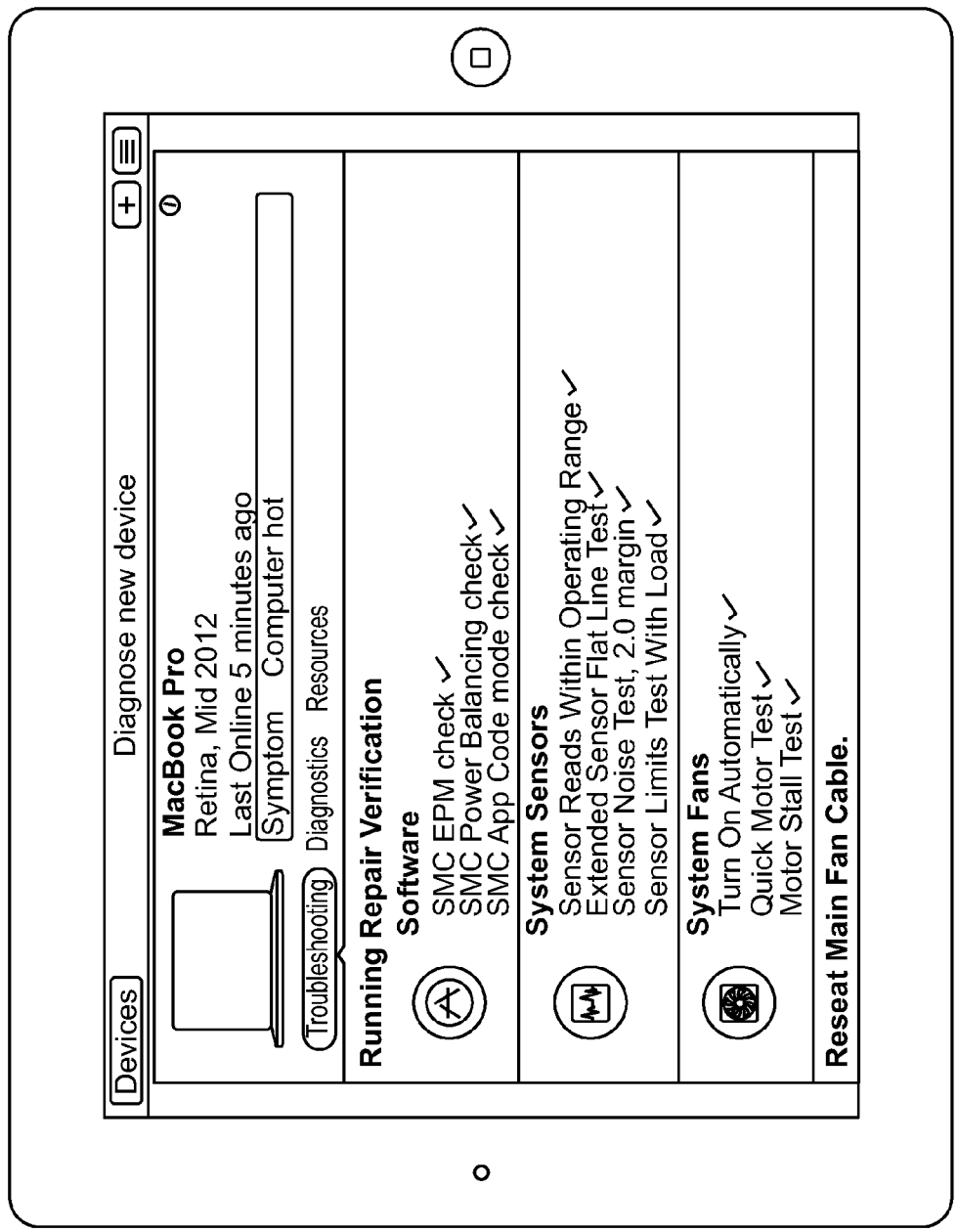
FIG. 25 illustrates graphical user interface elements from an exemplary troubleshooting session according to some embodiments of the present technology.
Figure 26:
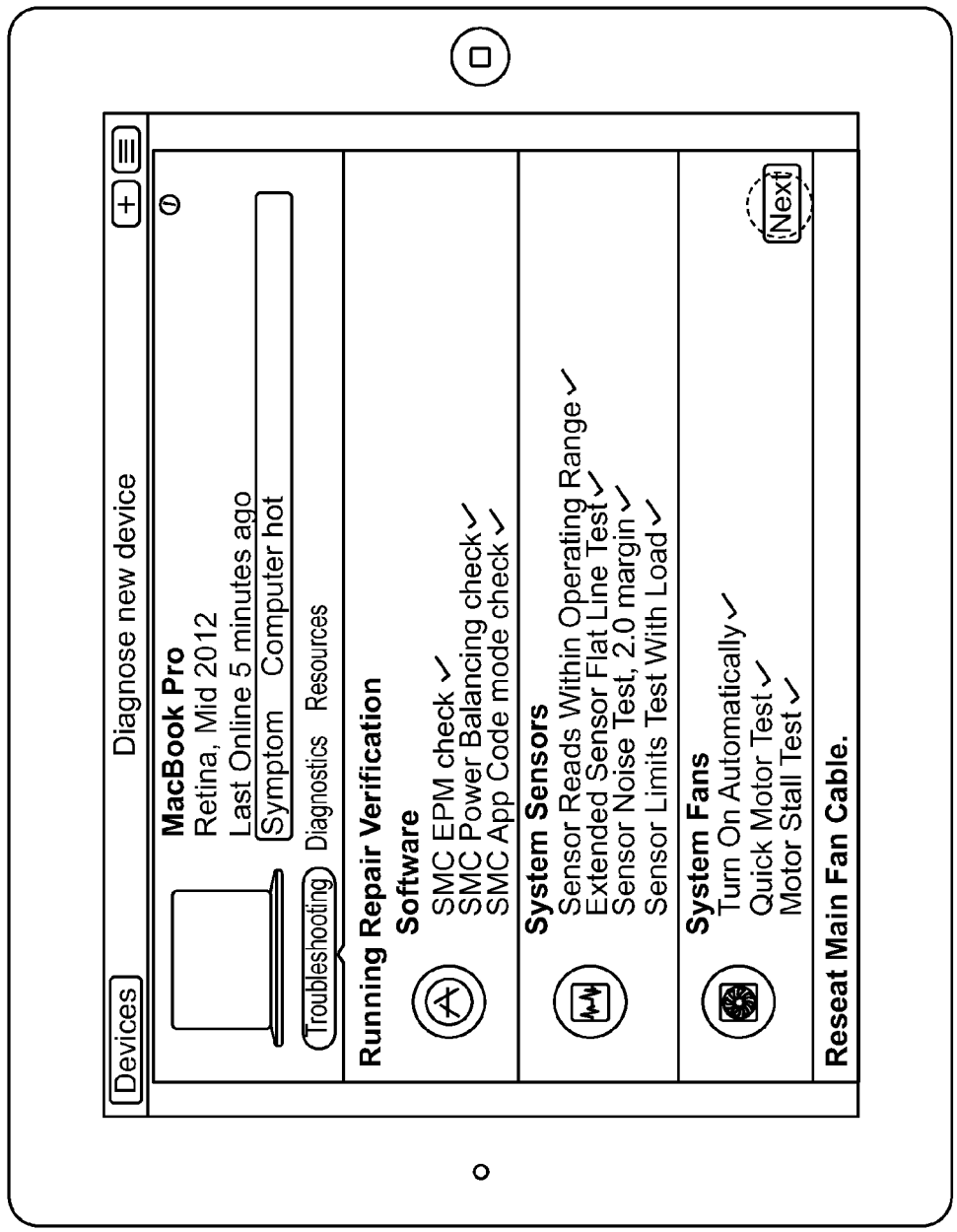
FIG. 26 illustrates graphical user interface elements from an exemplary troubleshooting session according to some embodiments of the present technology.

When a user chooses to run the diagnostic tests suggested by the AIDE system, the GUI can display the results of the test. For example, FIGS. 21-22 illustrates a GUI displaying the results of cooling system diagnostic test. The GUI shows that the software and system sensor tests were carried out with success, but that the system fans tests failed. FIG. 23 illustrates an example of a video being shown in response to the failed test and selected to address the most probable cause of the symptom based on the inputs and the diagnostic results. FIG. 24 illustrates a GUI for requesting feedback after watching the video and performing the recommended fixes. Once the user confirms that he has performed the suggested fix, the GUI will again show that the UUT is running the diagnostic text (as shown in FIG. 25). Likewise, FIG. 26 illustrates a GUI screen confirming that the diagnostic tests indicate normal operation, thus indicating that the suggested fix solved the identified symptom.

In some embodiments, a record is stored on the AIDE platform memorializing the symptoms identified, solutions suggested, success/failure of the suggested fix(es), etc.

Figure 27A:
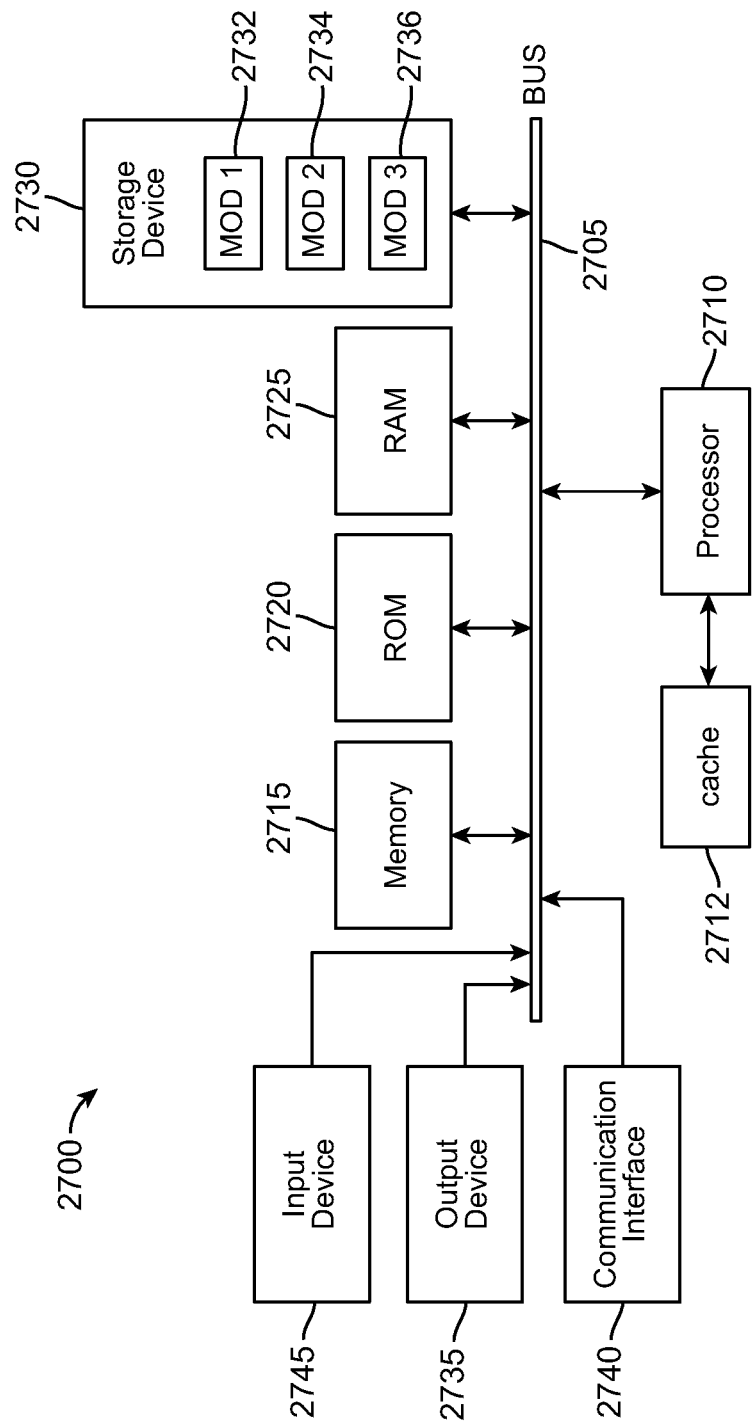
FIG. 27A illustrates an exemplary possible system embodiments according to some embodiments of the present technology.
Figure 27B:
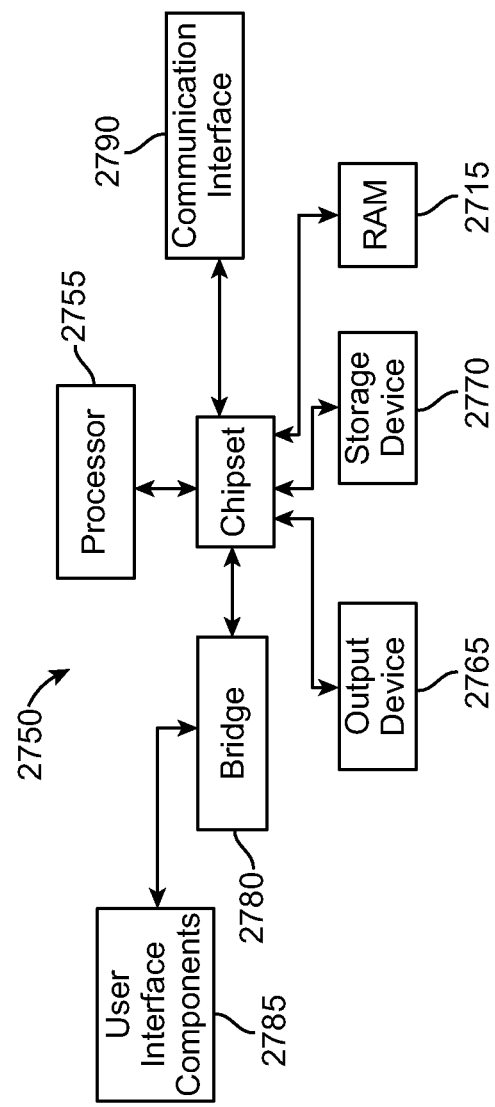
FIG. 27B illustrates an exemplary possible system embodiments according to some embodiments of the present technology.

FIG. 27A, and FIG. 27B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 27A illustrates a conventional system bus computing system architecture 2700 wherein the components of the system are in electrical communication with each other using a bus 2705. Exemplary system 2700 includes a processing unit (CPU or processor) 2710 and a system bus 2705 that couples various system components including the system memory 2715, such as read only memory (ROM) 2720 and random access memory (RAM) 2725, to the processor 2710. The system 2700 can include a cache of high-speed memory connected directly with, in close proximity to, or integrated as part of the processor 2710. The system 2700 can copy data from the memory 2715 and/or the storage device 2730 to the cache 2712 for quick access by the processor 2710. In this way, the cache can provide a performance boost that avoids processor 2710 delays while waiting for data. These and other modules can control or be configured to control the processor 2710 to perform various actions. Other system memory 2715 may be available for use as well. The memory 2715 can include multiple different types of memory with different performance characteristics. The processor 2710 can include any general purpose processor and a hardware module or software module, such as module 1 2732, module 2 2734, and module 3 2736 stored in storage device 2730, configured to control the processor 2710 as well as a special-purpose processor where software instructions are incorporated into the actual processor design. The processor 2710 may essentially be a completely self-contained computing system, containing multiple cores or processors, a bus, memory controller, cache, etc. A multi-core processor may be symmetric or asymmetric.

To enable user interaction with the computing device 2700, an input device 2745 can represent any number of input mechanisms, such as a microphone for speech, a touch-sensitive screen for gesture or graphical input, keyboard, mouse, motion input, speech and so forth. An output device 2735 can also be one or more of a number of output mechanisms known to those of skill in the art. In some instances, multimodal systems can enable a user to provide multiple types of input to communicate with the computing device 2700. The communications interface 2740 can generally govern and manage the user input and system output. There is no restriction on operating on any particular hardware arrangement and therefore the basic features here may easily be substituted for improved hardware or firmware arrangements as they are developed.

Storage device 2730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 2725, read only memory (ROM) 2720, and hybrids thereof.

The storage device 2730 can include software modules 2732, 2734, 2736 for controlling the processor 2710. Other hardware or software modules are contemplated. The storage device 2730 can be connected to the system bus 2705. In one aspect, a hardware module that performs a particular function can include the software component stored in a computer-readable medium in connection with the necessary hardware components, such as the processor 2710, bus 2705, display 2735, and so forth, to carry out the function.

FIG. 27B illustrates a computer system 2750 having a chipset architecture that can be used in executing the described method and generating and displaying a graphical user interface (GUI). Computer system 2750 is an example of computer hardware, software, and firmware that can be used to implement the disclosed technology. System 2750 can include a processor 2755, representative of any number of physically and/or logically distinct resources capable of executing software, firmware, and hardware configured to perform identified computations. Processor 2755 can communicate with a chipset 2760 that can control input to and output from processor 2755. In this example, chipset 2760 outputs information to output 2765, such as a display, and can read and write information to storage device 2770, which can include magnetic media, and solid state media, for example. Chipset 2760 can also read data from and write data to RAM 2775. A bridge 2780 for interfacing with a variety of user interface components 2785 can be provided for interfacing with chipset 2760. Such user interface components 2785 can include a keyboard, a microphone, touch detection and processing circuitry, a pointing device, such as a mouse, and so on. In general, inputs to system 2750 can come from any of a variety of sources, machine generated and/or human generated.

Chipset 2760 can also interface with one or more communication interfaces 2790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 2755 analyzing data stored in storage 2770 or 2775. Further, the machine can receive inputs from a user via user interface components 2785 and execute appropriate functions, such as browsing functions by interpreting these inputs using processor 2755.

It can be appreciated that exemplary systems 2700 and 2750 can have more than one processor 2710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A system comprising:
one or more processors; and
a computer-readable medium including one or more sequences of instructions that, when executed by the one or more processors, cause the system to:
initiate a troubleshooting session for a remote user device connected to the system through a network;
receive troubleshooting session data including user-identified symptoms and device specifications for the user device;
store a plurality of diagnostic case hierarchies describing possible diagnostic solutions for a plurality of technical problems;
generate effectiveness data describing an effectiveness of the diagnostic solutions for solving past technical problems;
transmit the effectiveness data to the user device for diagnosing a symptom;
analyze the troubleshooting session data, diagnostic case hierarchies, and effectiveness data in order to recommend one or more remediation inferences for the troubleshooting session, the remediation inferences for diagnostically resolving the user-identified symptoms;
dynamically generate a package of one or more scripts for the troubleshooting session based on the remediation inferences for the troubleshooting session;
transmit the package of one or more scripts for the troubleshooting session to the user device for execution on the user device which, when executed on the user device, run a diagnostic test to determine a cause of the user-identified symptom and to recommend a solution to the user-identified symptom; and
accept feedback from a user device describing the effectiveness of the recommended diagnostic solutions; and
store the feedback for use in future analysis.

2. The system of claim 1, wherein the instructions cause the system to:
gather user-identified symptoms;
analyze device specifications;
identify one or more cases from the case hierarchies having attributes matching the symptoms and specifications;
score the one or more identified cases using a scoring algorithm for selecting the cases most likely to provide solutions to the identified symptoms; and
prompt the user to execute one or more action recommended by one or more cases from a group of highest scoring case.

3. The system of claim 2, wherein the instructions cause the system to:
receive feedback that one or more of the actions resolved the identified symptom; and
store information indicating that the recommended actions resolved the identified symptom.

4. The system of claim 2, wherein the instructions cause the system to:
- receive feedback that one or more of the actions did not resolve the identified symptom;
- identify an additional case from the case hierarchies having attributes matching the symptoms and specifications;
- score the additional case using a scoring algorithm;
- determine that the additional case has a score exceeding a predetermined threshold; and
- prompt the user to execute one or more action recommended by the additional case.

5. A method of troubleshooting comprising:
- receiving a problem statement describing a technical problem associated with a user device, the problem statement including symptoms associated with the technical problem;
- selecting a first problem domain comprising a plurality of past troubleshooting cases containing a symptom identified in the problem statement;
- generating a score for each troubleshooting case in the plurality of past troubleshooting cases, where the score for a particular one of the troubleshooting cases is generated based on weighted scores for each symptom corresponding to the troubleshooting case that matches the symptoms in the problem statement;
- determining whether the score for any of the troubleshooting cases exceeds a threshold score;
- when a score of a troubleshooting case within the first problem domain exceeds a threshold score, delivering a remediation object associated with the troubleshooting case to the user device;
- when the scores of a troubleshooting cases within the first problem domain do not exceed a threshold score, iteratively selecting and scoring additional problem domains until a troubleshooting case having a score exceeding the threshold score is identified.

6. The method of claim 5, further comprising:
- receiving a user input relating to a technical problem of the user device;
- transmitting a request for the results of a diagnostic test that can be performed by the user device; and
- receiving the results of the diagnostic test, wherein the problem statement comprises a combination of user-identified and the results of the diagnostic test.

7. The method of claim 5, further comprising:
- retrieving the plurality of database items from a case database, wherein the database items comprise cases that represent technical performance situations and remediation actions that be performed to remediate problems associated with the situations.

8. The method of claim 7, further comprising:
- assigning a weight to each of the cases to reflect the likelihood that a remediation action will address a technical performance situation; and
- wherein the step of determining a score of a case comprises adjusting the score based on the weight of the case.

9. The method of claim 5, wherein the remediation object comprises an instruction to a user of the user device to perform an action.

10. The method of claim 5, wherein the remediation object comprises a script for performing a remediation action on the user device, the method further comprising:
- packaging the script in a form that can be interpreted by the user device; and
- transmitting the packaged script to the user.

11. The method of claim 5, wherein a first weighted score generated for a symptom in a first past troubleshooting case is different than a second weighted score generated for the symptom in a second past troubleshooting case.

* * * * *